United States Patent [19]

Hollingsworth et al.

[11] Patent Number: 5,016,895
[45] Date of Patent: May 21, 1991

[54] CYCLE FORK WITH FIBER REINFORCED RESIN BLADES AND CROWN AND METHOD OF MAKING SAME

[75] Inventors: Ritch Hollingsworth, Fair Oaks; John Mouritsen, New Castle, both of Calif.

[73] Assignee: Cycle Composites, Inc., Watsonville, Calif.

[21] Appl. No.: 382,127

[22] Filed: Jul. 19, 1989

[51] Int. Cl.⁵ .................................................. B62K 21/04
[52] U.S. Cl. .................................... 280/280; 264/258
[58] Field of Search ............ 280/276, 279, 280, 281.1; 264/258, 257

[56] References Cited

U.S. PATENT DOCUMENTS

| | | | |
|---|---|---|---|
| 312,732 | 2/1885 | Knous et al. | 280/279 |
| 345,465 | 7/1886 | Waite | 280/279 |
| 366,287 | 7/1887 | Yost et al. | 280/279 |
| 589,147 | 8/1897 | Sturges | 280/280 |
| 593,814 | 11/1897 | Bango | 280/279 |
| 609,937 | 8/1898 | Kelly | 280/280 |
| 649,633 | 5/1900 | Fauber | 280/280 |
| 660,875 | 10/1900 | Wambach | 280/279 |
| 1,998,992 | 4/1935 | Johnson et al. | 280/280 |
| 2,120,453 | 6/1938 | Anderson | 280/152.1 |
| 3,039,791 | 6/1962 | Horowitz et al. | 280/279 X |
| 3,493,240 | 2/1970 | Jenks | 280/610 |
| 3,641,230 | 2/1972 | Jenks | 264/152 |
| 3,833,242 | 9/1974 | Thompson, Jr. | 280/281.1 |
| 4,008,903 | 2/1977 | Ramond | 280/279 |
| 4,062,917 | 12/1977 | Hill et al. | 264/102 |
| 4,079,957 | 3/1978 | Blease | 280/278 |
| 4,183,776 | 1/1980 | Staub et al. | 156/156 |
| 4,493,749 | 1/1985 | Brezina | 156/187 |
| 4,627,307 | 12/1986 | Yamazawa et al. | 74/552 |
| 4,657,795 | 4/1987 | Foret | 428/36 |
| 4,662,645 | 5/1987 | McMurtrey | 280/279 |
| 4,724,115 | 2/1988 | Freeman | 264/513 |
| 4,740,346 | 4/1988 | Freeman | 264/258 |
| 4,828,285 | 5/1989 | Foret et al. | 280/279 |
| 4,828,781 | 5/1980 | Duplessis et al. | 264/250 |
| 4,850,607 | 7/1989 | Trimble | 280/281.1 |
| 4,889,355 | 12/1989 | Trimble | 280/281.1 |
| 4,902,458 | 2/1990 | Trimble | 264/46.6 |
| 4,923,203 | 5/1990 | Trimble et al. | 280/288.3 |
| 4,941,674 | 7/1990 | Trimble | 280/281.1 |

FOREIGN PATENT DOCUMENTS 0275797 7/1988 European Pat. Off. ............ 280/279

Primary Examiner—Andres Kashnikow
Assistant Examiner—Brian L. Johnson
Attorney, Agent, or Firm—Pollock, Vande Sande & Priddy

[57] ABSTRACT

A fork assembly including a stiff steerer tube assembly of metal or the like connected to a generally hollow unitary crown and blade component made of molded resin impregnated fibrous material. The unitary component has at least two adjacent wall sections united by an integrally uniting junction formed by overlapped parts of the sections having sufficiently intimate contact therebetween for stress loadings to be transferred from fiber to fiber across the juncture. The steerer assembly may include a laterally extending and downwardly projecting anchor member which is adhered to an inside surface of the unitary component and may be laminated between overlapping wall sections.

35 Claims, 15 Drawing Sheets

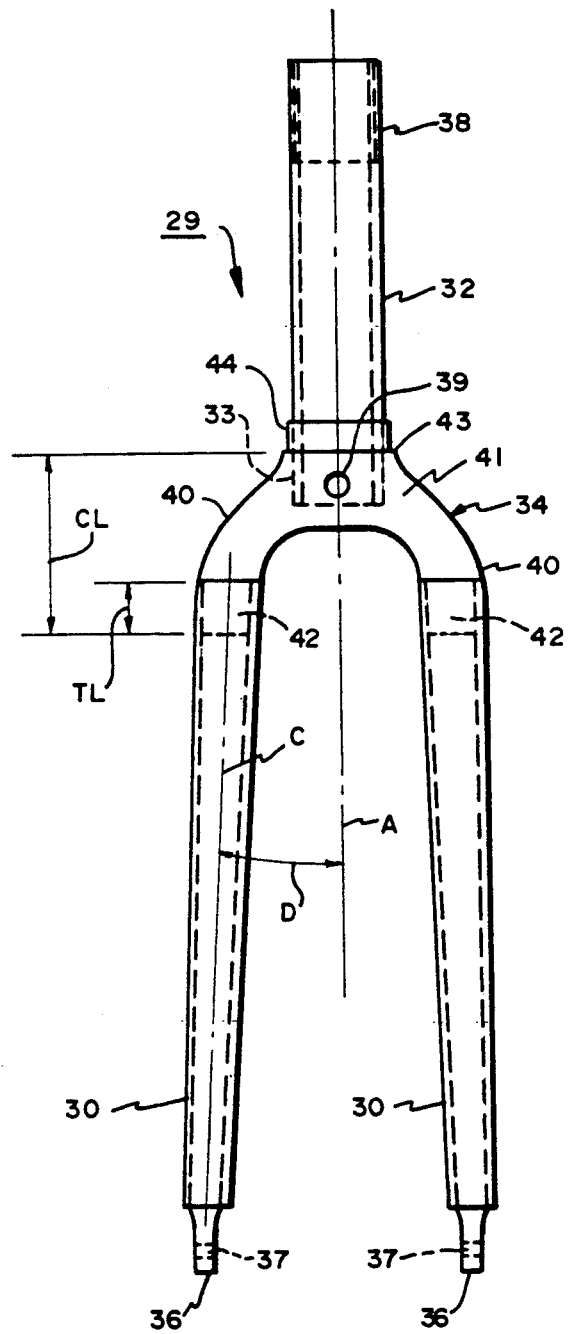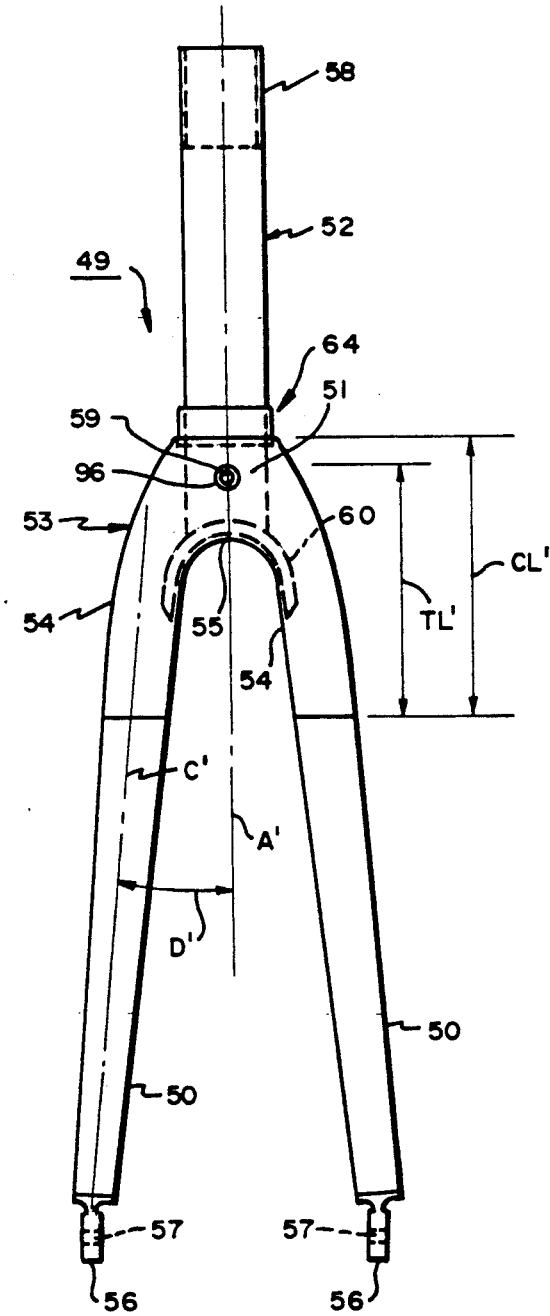
FIG.1 PRIOR ART
FIG.2

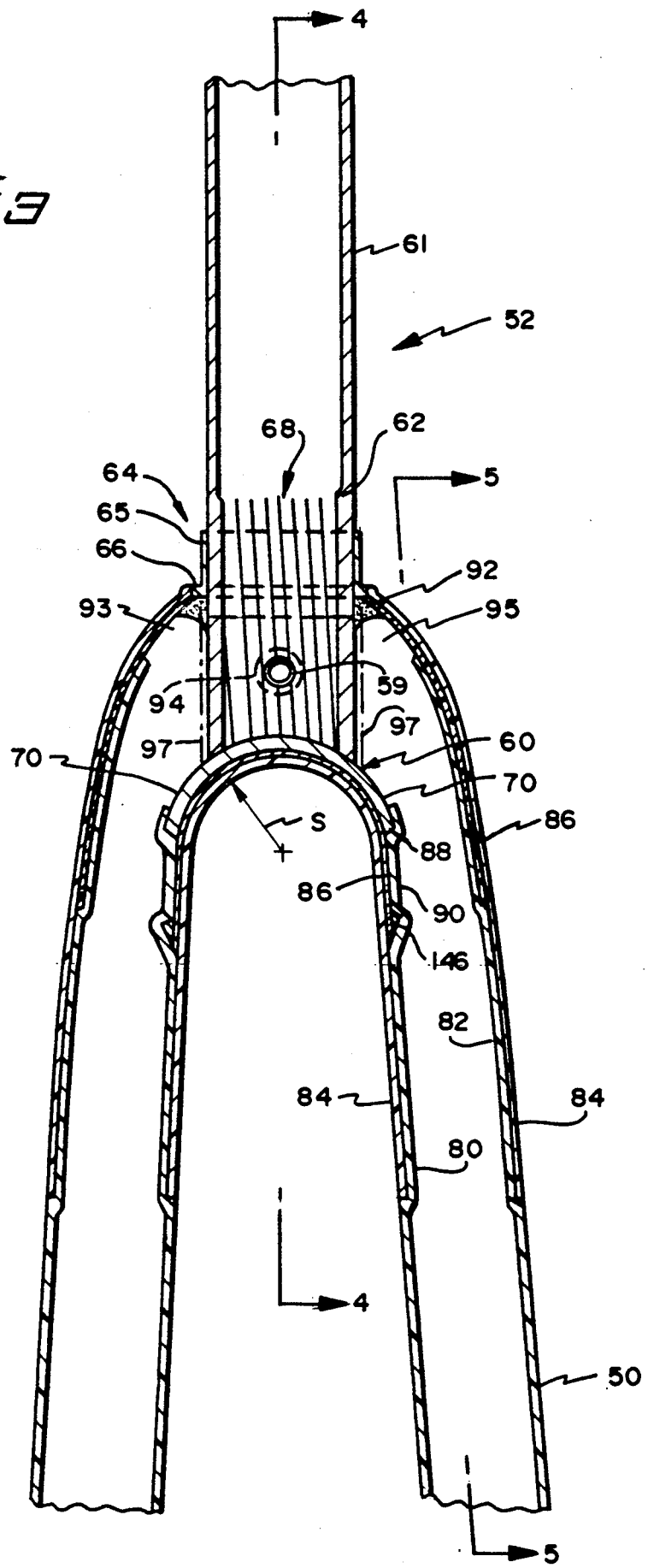

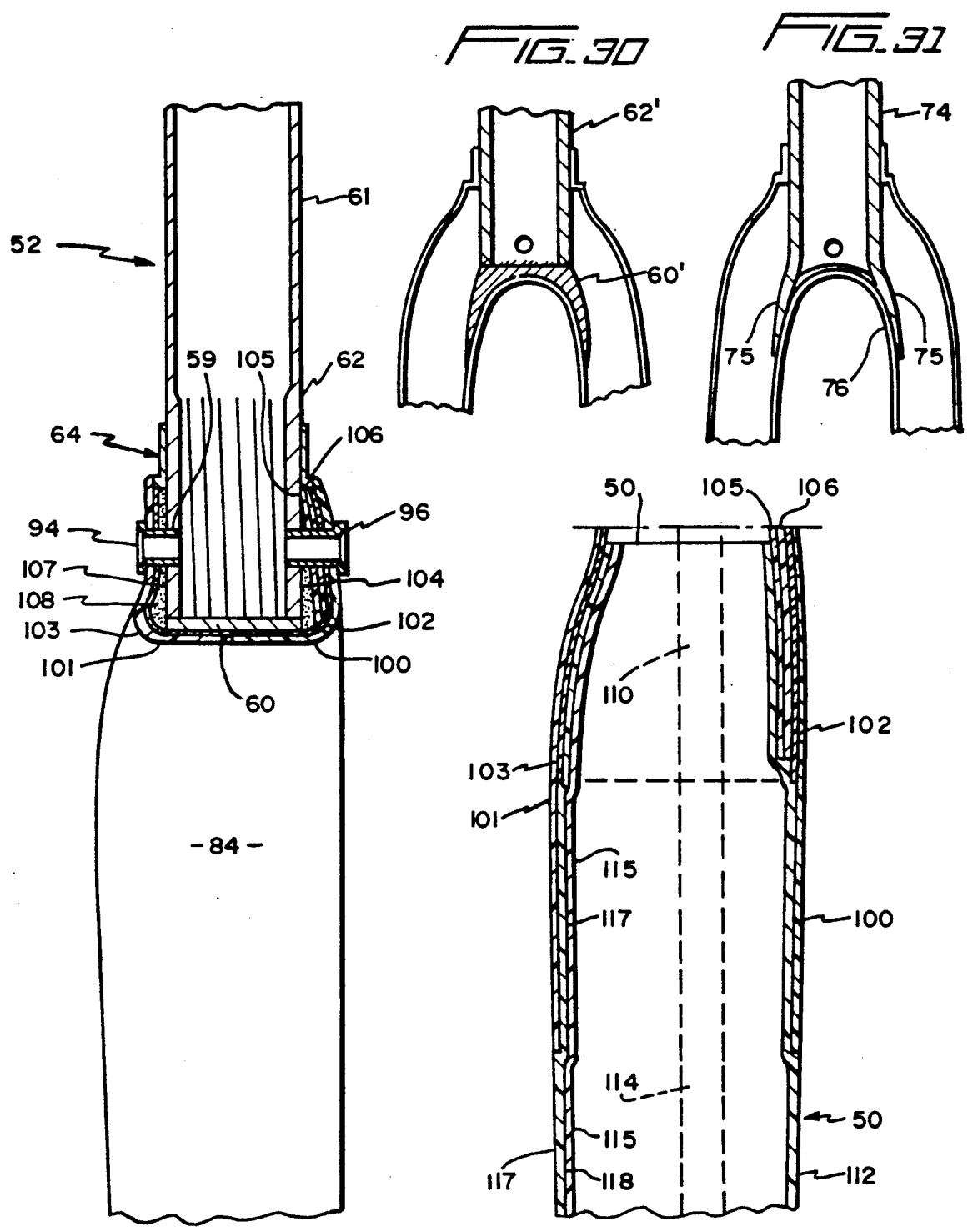

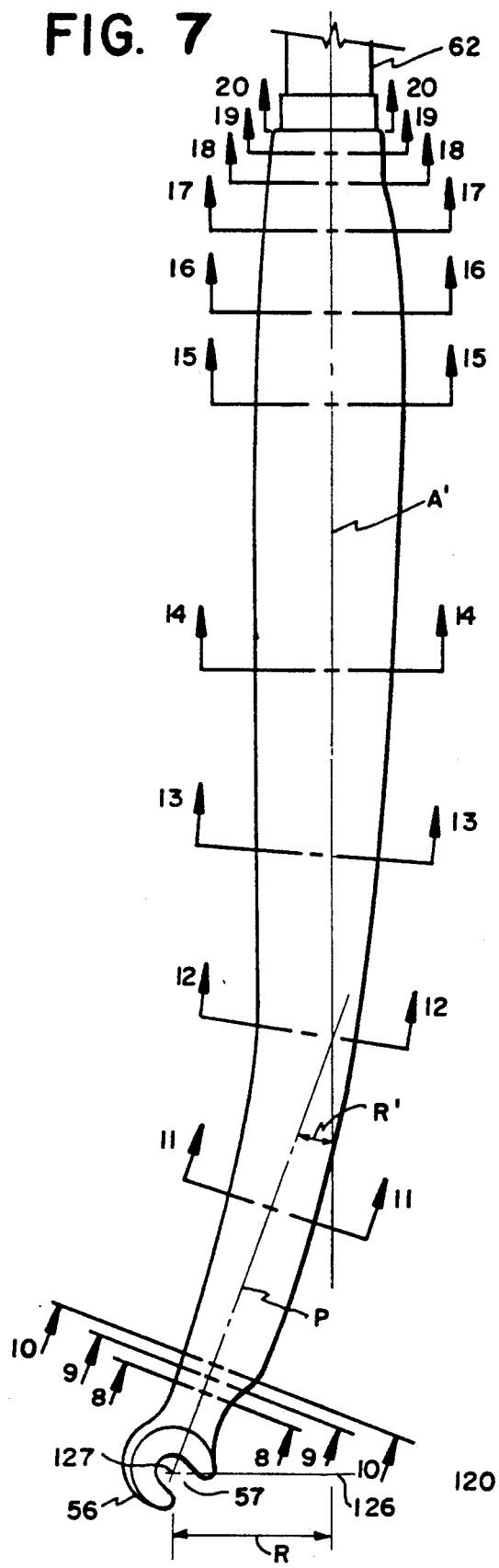
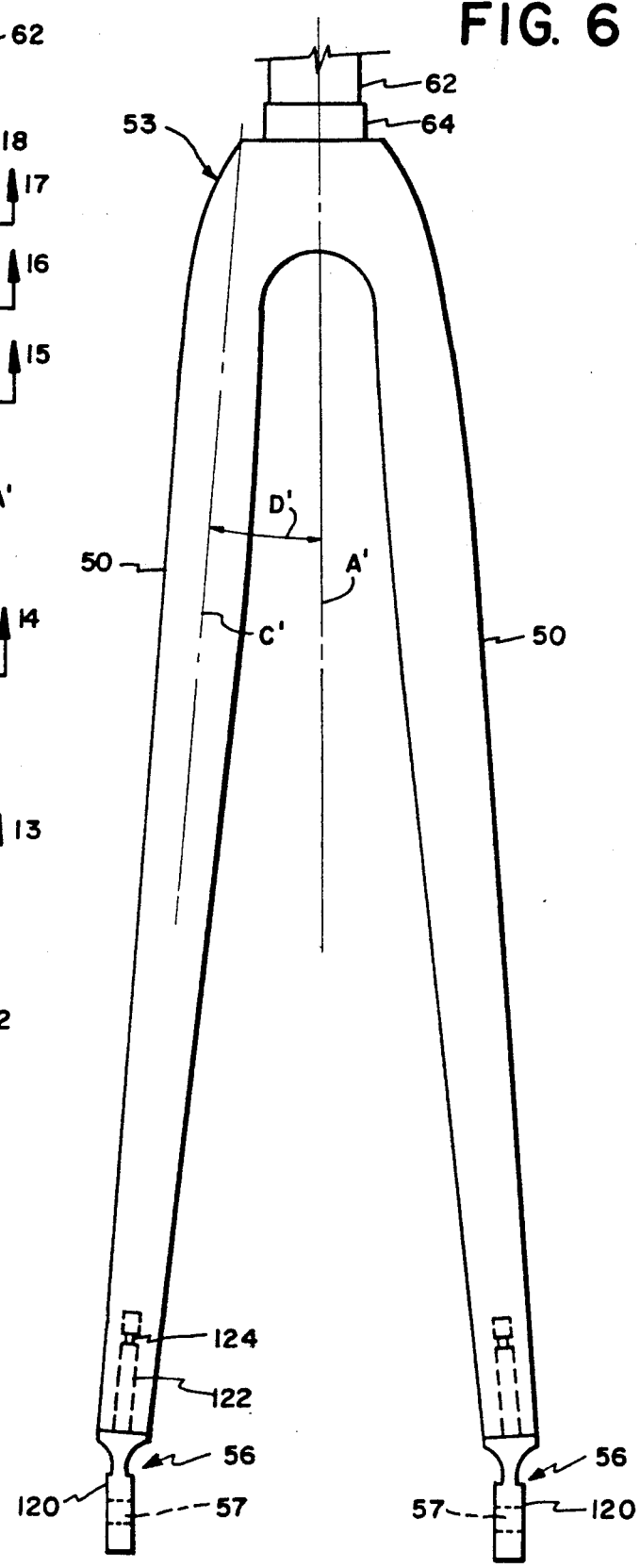

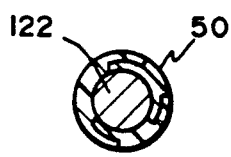
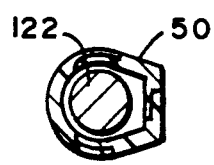
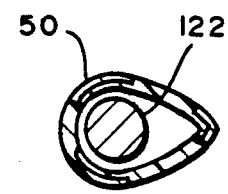
FIG.8  FIG.9  FIG.10
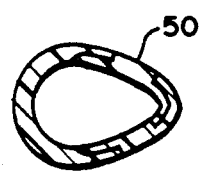
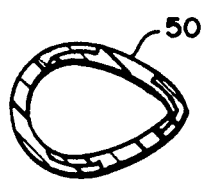
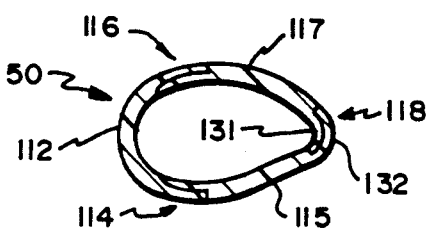
FIG.11  FIG.12  FIG.13
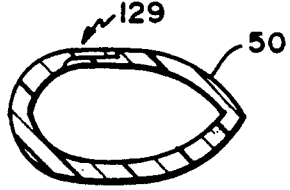
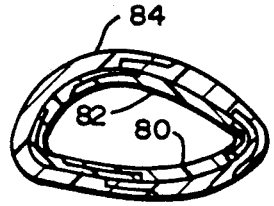
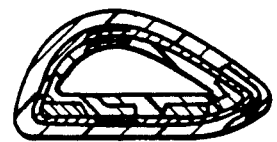
FIG.14  FIG.15  FIG.16
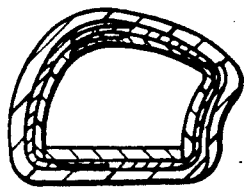
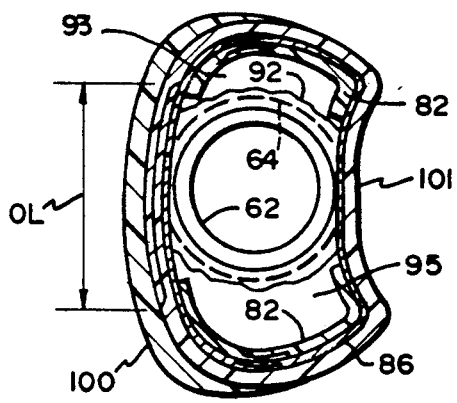
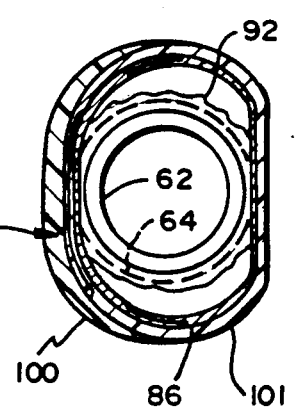
FIG.17  FIG.18  FIG.19
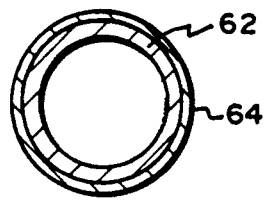
FIG.20

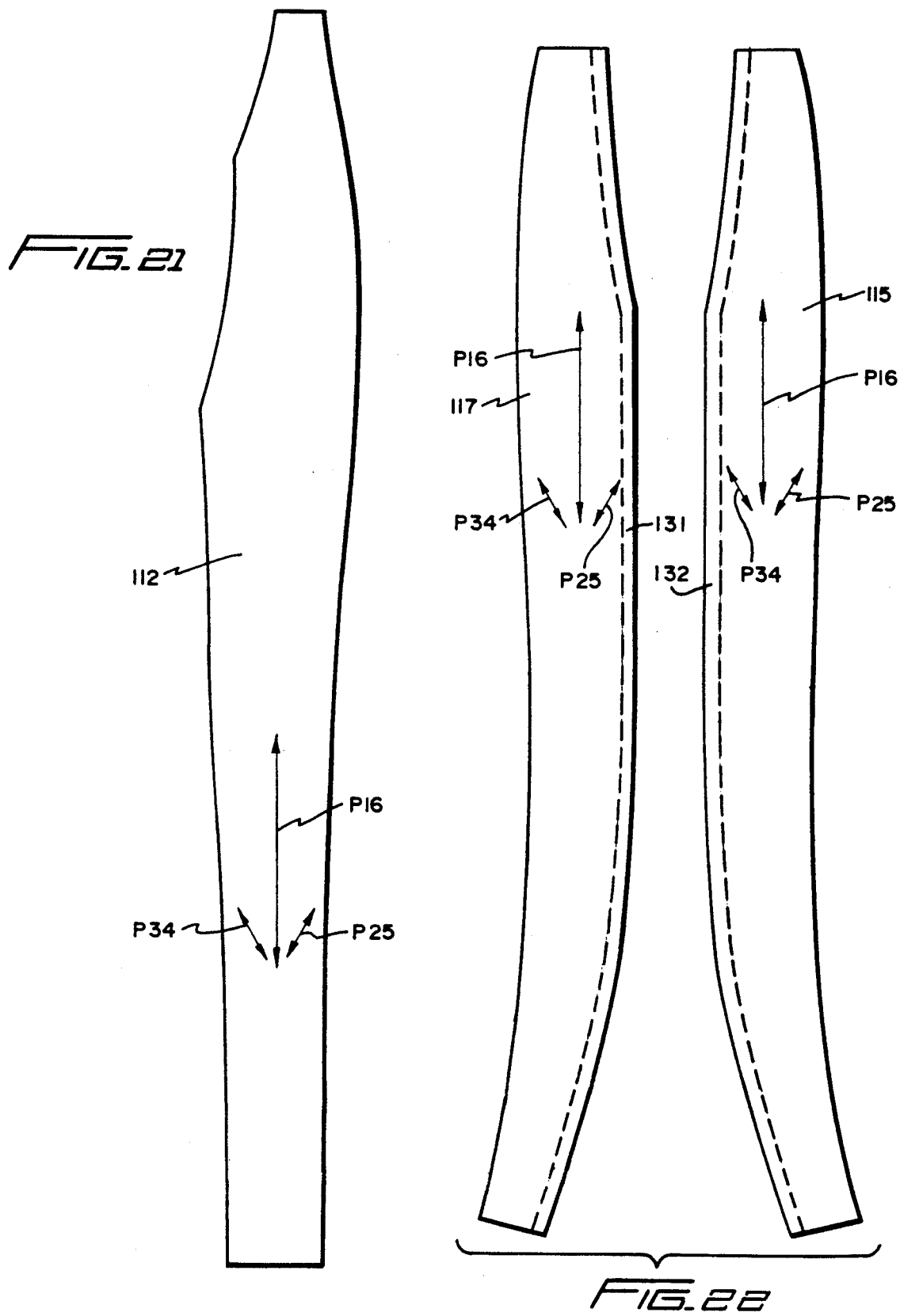

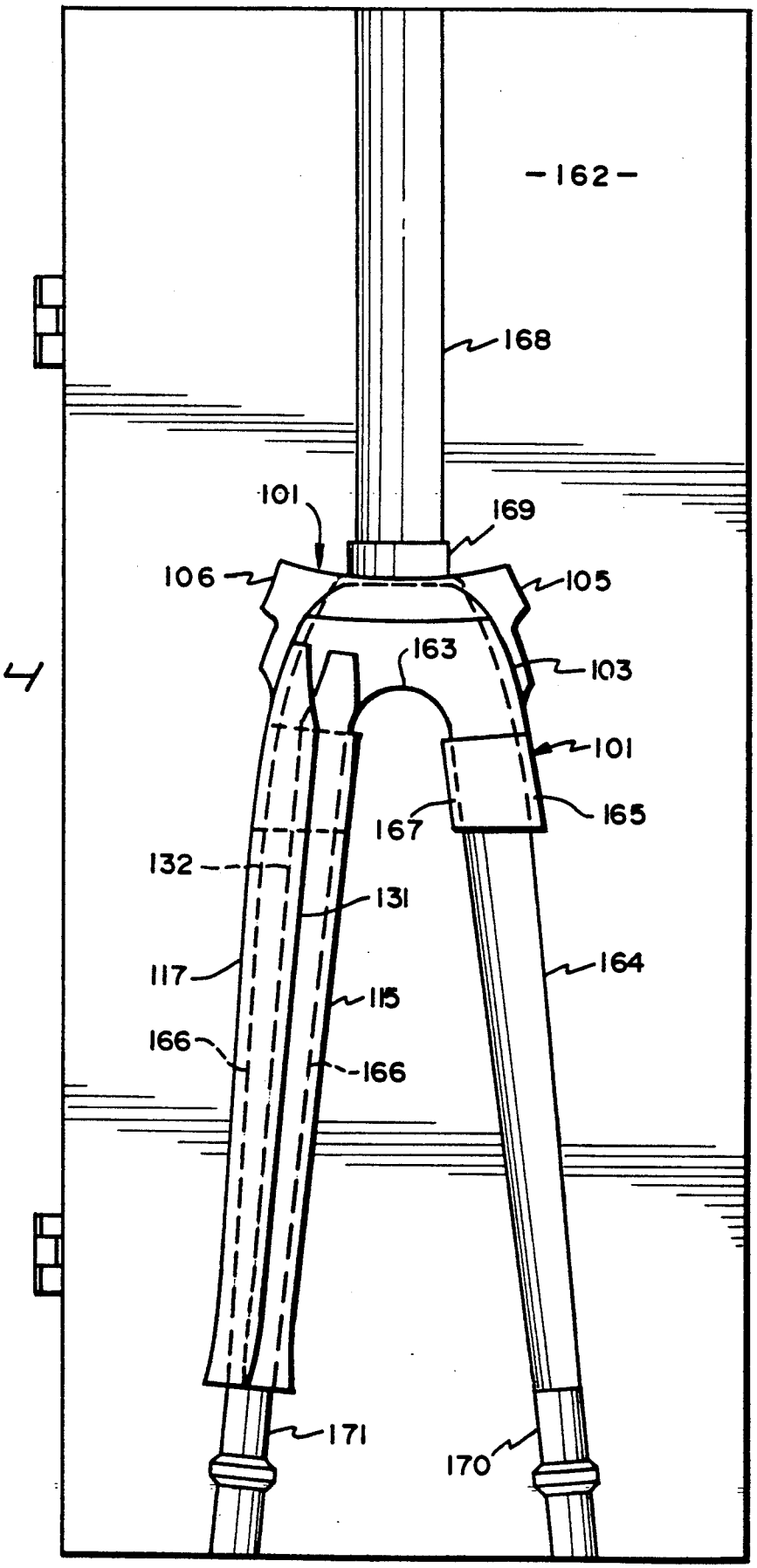

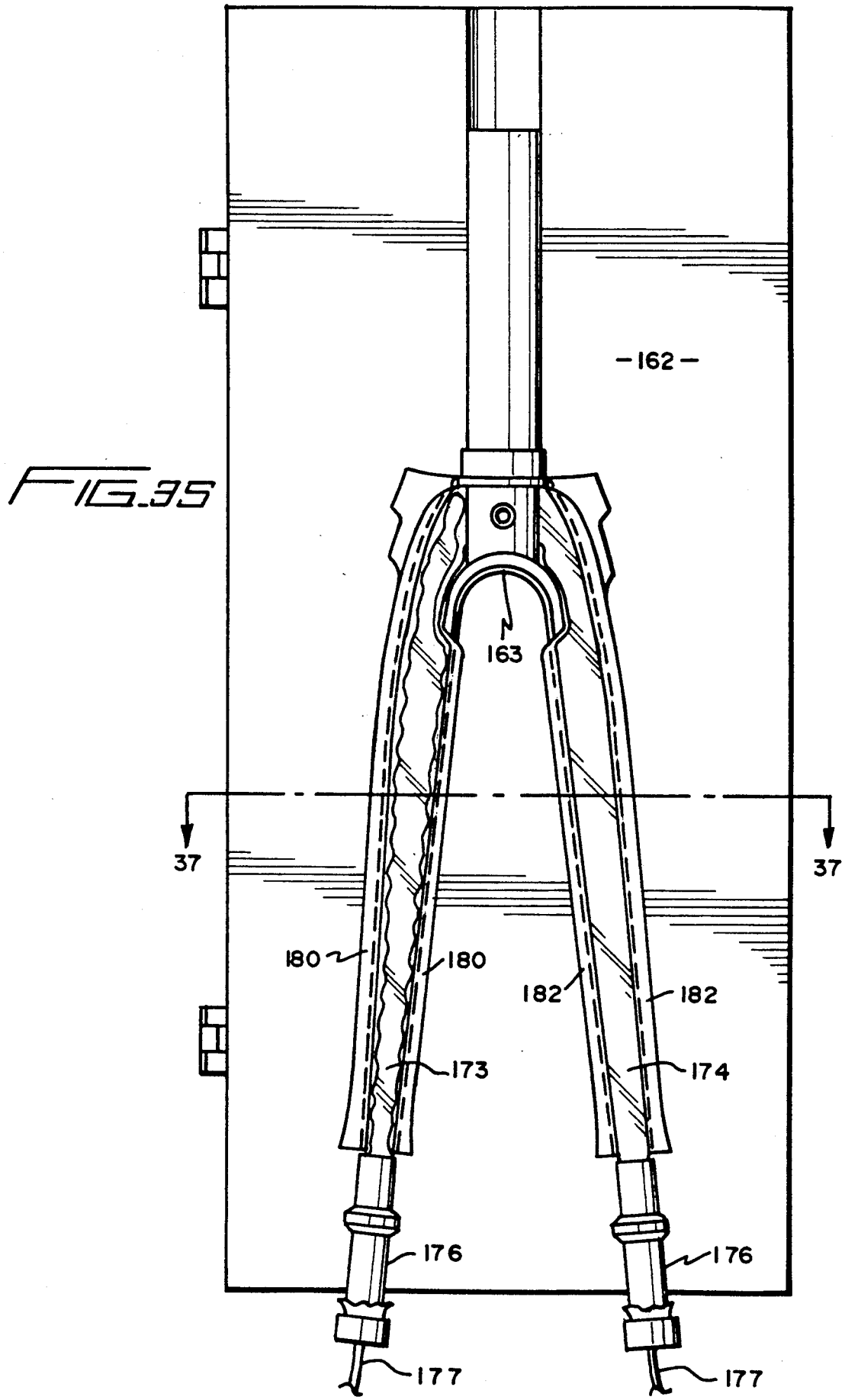

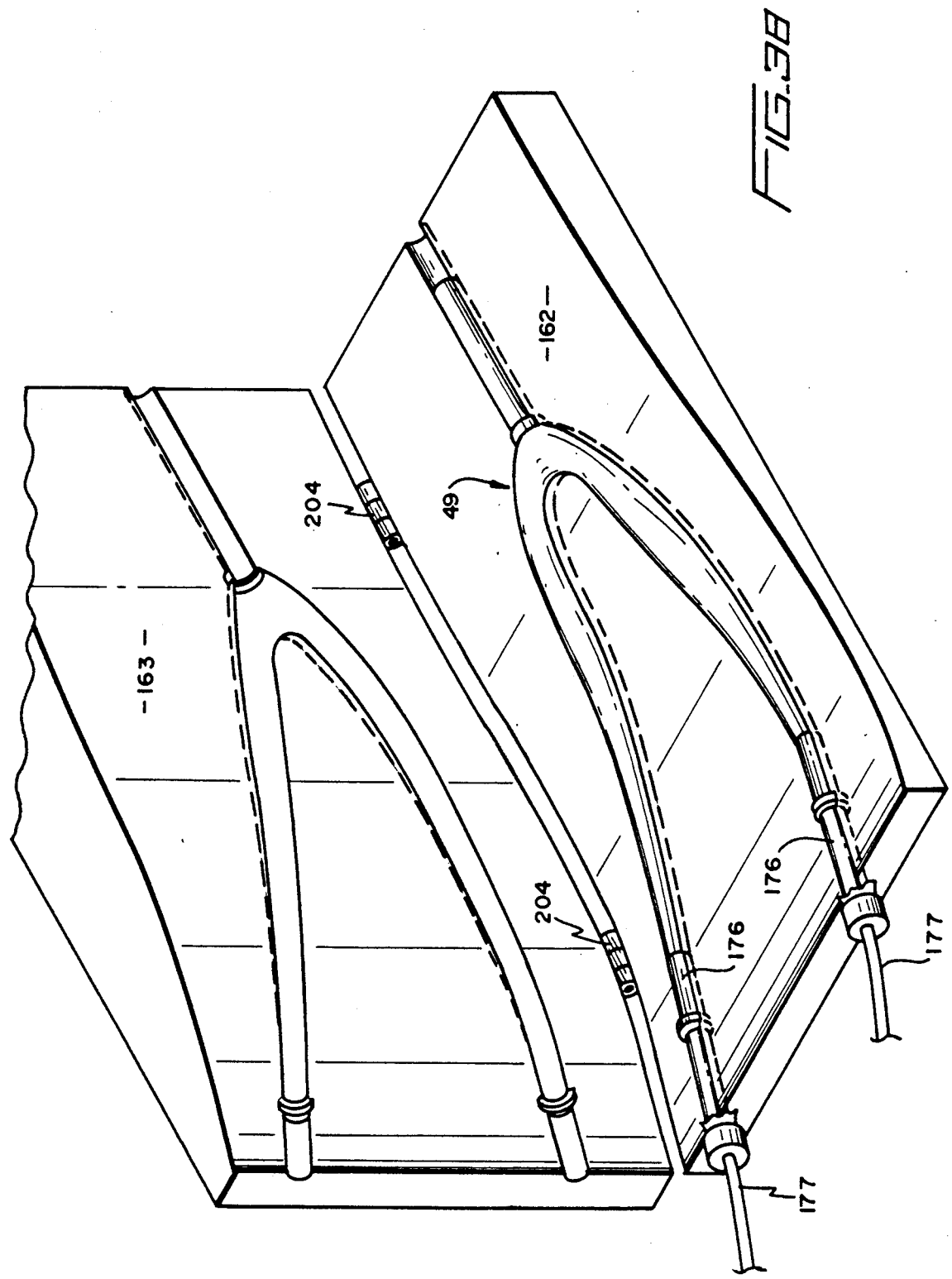

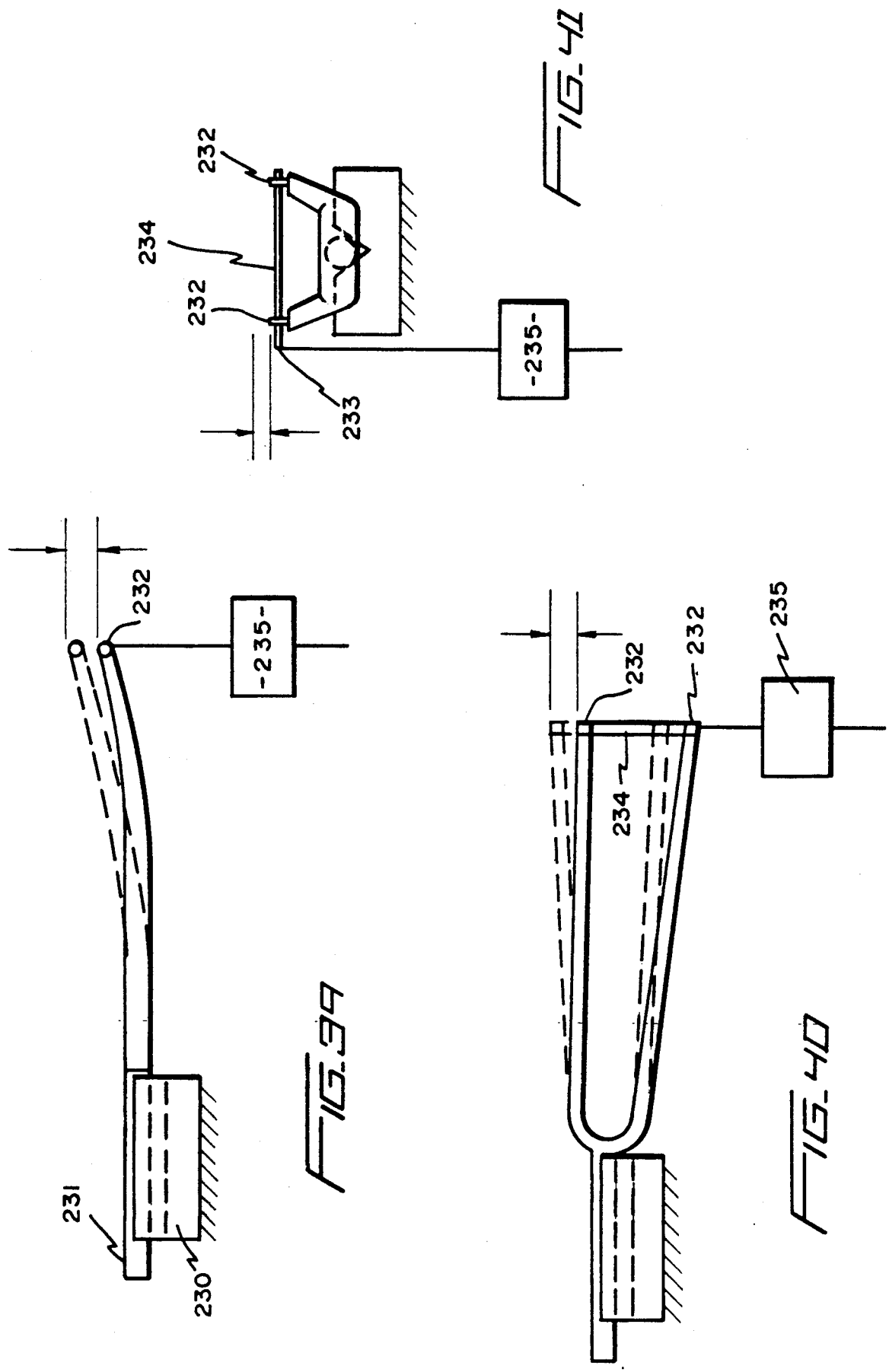

CYCLE FORK WITH FIBER REINFORCED RESIN BLADES AND CROWN AND METHOD OF MAKING SAME

TECHNICAL FIELD

The present invention relates to forks for mounting wheel assemblies on cycles and to methods for making such forks. More particularly, the present invention relates to cycle forks, such as the front fork of a bicycle, having a unitary crown and blade component made from fibrous material impregnated with a synthetic resin and a rigid steerer assembly of metal or equivalent plastic to which the unitary crown and blade component is integrally connected.

BACKGROUND OF THE INVENTION

The front fork assembly of a bicycle is rotatably mounted in the head tube of the bicycle frame and carries and connects the handle bars to the front wheel assembly of the bicycle. A conventional front fork for a bicycle comprises a pair of blades connected to a steerer tube by a crown component. A composite fork of steel and aluminum parts is generally preferred over a fork made entirely of steel parts because all steel forks are generally too heavy to use on a high performance road or racing bike. The conventional fork therefore may be a composite of different metals, such as a hollow steel steerer tube connected to a pair of hollow aluminum blades by a solid aluminum crown as illustrated in FIG. 1 of the drawings. The different components of these conventional fork assemblies may be secured together by swaging, shrink fitting, welding, adhesive or the like.

The crown component may be an inverted Y-shaped structure with depending legs, the lower portions of which are each inserted in a socket at the upper end of a corresponding blade. The base of this inverted Y-shaped crown is connected to the steerer tube. In other conventional fork assemblies, the lower end portion of each crown leg may comprise a socket instead of a projection and the upper end portion of the corresponding blade fits within this socket. In these alternative prior art embodiments, the crown length CL and the transition length TL are generally about the same as for the conventional structure illustrated in FIG. 1.

A light weight all steel fork may weigh about 1.5 lbs. at a minimum. The assembled parts of a composite steel/aluminum fork, wherein the steel pieces are replaced by aluminum pieces with the exception of the steel steerer tube, may weigh between 1.2 and 1.3 lbs. at a minimum. In both, the legs of the crown may be designed to fit down into sockets at the upper ends of the fork blades or the upper ends of the fork blades may be designed to fit up into sockets at the lower ends of the crown legs. The crown of a composite aluminum/steel fork may be a solid aluminum forging with a small hole therein to allow water to drain from the inside of the steerer tube.

Both in the all-steel fork and in the composite steel/aluminum fork, the base of the steel steerer tube is required to withstand the high bending loads to which a front fork is subjected in response to the different forces encountered by a bicycle as it is ridden. The steerer tube therefore is a critical link between the front wheel and the bicycle frame. For this reason, the wall thickness of the steerer tube is sometimes increased significantly, but this adds appreciable weight to the fork assembly. In addition, one important design consideration in making the steerer tube is that it must interface with conventional handle bar stems which require a standard internal tube diameter. This may prohibit the use of steerer tubes with a thicker wall, at least at the handle bar interface, in a front fork designed for industry wide use.

The crown is also a critical link between the front wheel and the bicycle frame because it must take the relatively high loads from the blades and transfer them to the steerer tube through relatively small cross sectional areas. These relatively small areas are at the joints between the different fork components and result in very high stress loadings across these joints. Many prior art forks tend to fail either at the interface of the blades and the crown or at the interface of the crown and the steel steerer tube. Because of the small interface area between the crown structure and the cylindrical base found on conventional steerer tubes, the levels of stress in this interface area is greatly increased over average stress levels in the fork and therefore prior arts forks often fail in or adjacent to this interface area. Stress concentrations in these interface areas may be further aggravated because of the difference in materials where a resin adhesive, a brazing flux or a part made of another metal meets the steel of a steerer tube at the interface. The crown piece therefore transitions the stress loadings from the fork blades to the steerer tube and, thus, serves as a critical link in the load path from the front wheel to the steerer tube. These stress loadings are then passed by the steerer tube to the head tube of the bicycle frame.

In conventional metal forks of the foregoing types, the multiplicity of connections required between the blades and the crown on the one hand and the crown and the steerer tube on the other hand may be made by welding, braising, adhesive compositions, or friction joints such as swaging or shrink fitting. Welding and braising add undesirable weight to the fork. Adhesive compositions for joining different metal parts have significantly different compliance characteristics and thermal expansion coefficients from metal, and therefore often result in excessive concentrations of stresses in the adhesive layer, which in turn may lead to early joint failure. Friction joints also have stress concentrations at the interfaces between parts and generally are not sufficiently strong to sustain the high loads which must be transferred from blade to crown and from crown to steerer tube. It is also difficult, time consuming and expensive to provide metal blades with the cross-sectional shapes required for aesthetic and/or aerodynamic styling.

Prior efforts have been made to address at least some of the foregoing problems with forks made of composite materials comprising a resin reinforced by a fibrous material. For example, U.S. Pat. No. 4,828,285 to Foret, et al., suggests a bicycle fork in the form of a molded, one piece assembly wherein the pivot, the fork head and the two blades are formed by winding textile strands around a previously formed core having the configuration of the fork to be produced and then impregnating the wound strands with an injected resin composition.

While forks of the Foret, et al., type may provide some advantages over conventional bicycle forks, such as improved stress distribution and higher fore and aft strength in the blade to crown area, they have a number of deficiencies. For example, a steel steerer tube generally has better strength, stiffness and performance characteristics than a resin and fiber steerer tube, and metal provides a better bearing surface than do such composite materials. In this regard, the Foret, et al., disclosure does not specifically address the provision of bearing surfaces between the composite fork described and the head tube of a conventional bicycle frame. In addition, tests have indicated that bicycle forks made entirely of textile reinforced resin and having a foam core may have poor compliance, torsional and other performance characteristics when used in combination with a conventional bicycle frame. The core materials around which the Foret, et al., fork is made and which are left in place also add significantly to the weight of the resulting fork structure.

The method by which the Foret, et al., fork is made also has a number of deficiencies. For example, the construction method requires winding numerous lengths of yarn around a rigid or semi-rigid polyurethane core and does not appear to be readily adaptable to efficient mass-production techniques. In addition, since the strands of yarn are wound dry and the fully wound core is then placed into a mold, the resin must be injected into the mold under high pressure. This resin transfer molding (RTM) process has at least two principal drawbacks, namely, it is difficult to achieve a high fiber volume because high fiber percentages block uniform distribution of the injected resin, and the foam core around which the fiber strands are wrapped must have an unusually high compressive strength to prevent its collapse under the high resin injection pressure. Although special high density foams of the necessary compressive strengths are available, these increase both the weight of the product and the cost of its manufacture.

DISCLOSURE OF THE INVENTION

The present invention overcomes the foregoing deficiencies of the prior art by providing an improved cycle fork having a unitary crown and blade component made from composite resin and fiber materials and integrally joined to a rigid steerer tube of metal or equivalent plastic by a unique connecting structure. This fork assembly may be made by a relatively easy and economical method which is readily adaptable to mass-production techniques. The materials of the respective components of this composite fork may be chosen so as to provide great strength combined with light weight. The unitary fiber and resin component also advantageously combines a strong and light weight crown structure with a strong and light weight blade structure having an aerodynamic shape which substantially reduces aerodynamic drag.

The invention therefore is capable of providing an unusually light (ultra-light) bicycle front fork having generally hollow tube-like blades and a generally hollow crown structure in combination with a steel steerer tube. The overall structure of this front fork provides unexpected strength and performance characteristics superior to both the metal composite forks and the resin and fiber composite forks of the prior art.

It is therefore an object of the present invention to replace conventional fork structures with a unique fork structure that takes advantage of both the properties of steerer tubes made of steel or equivalent plastic and the properties of fork blades made from advanced composite materials comprising textile or other fibrous materials impregnated with a synthetic resin. Another object of the invention is to provide a crown structure for transferring loads from hollow fork blades to a hollow steerer tube in a more efficient manner and without significant stress concentrations. These objects are accomplished by a unique crown and blade structure which provides a gradual transition from fork blades of such composite materials to a steel steerer tube, and thereby significantly increases strength in the crown area and greatly reduces or eliminates stress concentrations.

The fork of the invention utilizes a steerer tube having a unique foot portion at its base which is flared and includes depending legs extending down into the fork blades. This greatly increases the transition length TL, as well as the overall crown length CL. The loads being transferred from the fork blades to the steerer tube thus are not concentrated at the very end of the steerer tube but pass through a greatly increased transition length between blades and steerer tube. This allows for a lighter more efficient structure because the average loads which are passed through the crown area to the head tube of the bicycle frame are not nearly as high as the concentrated loads found in the crown area of fork structures of the prior art. The durability and integrity of this structure may be increased by laminating a part or all of the depending legs between layers of resin impregnated fibrous material. The integrity of the laminate may be further increased by moldedly or meldedly bonding the composite fork blades to the composite crown through apertures in the flared foot portion of the steerer tube.

The flared lower end of the steerer tube may be made in several ways. For example, the lower end of a standard steel steerer tube may be deformed to create an inverted Y-shaped structure with depending arms. Alternatively, the base of a separate piece having arms depending from the base may be rigidly joined to the lower end of a conventional steerer tube. This separate piece may be forged metal or stamped from a blank of sheet metal. Preferably, the legs are made by deforming an elongated blank of metal in the shape of a flat strap having two oval apertures, one near each end of the elongated blank. The elongated blank is then bent into an inverted U-shape and the base of the U welded to a corresponding cut-out at the lower end of the steerer tube. The flared lower end of the steerer tube may be laminated to the inner wall of the crown and/or blades or to the outer wall of the crown and/or blades, the former being preferred. Another alternative is to provide an upper radial skirt laminated to the outer crown and/or blade wall and a lower radial foot laminated to the inner crown wall and/or blade wall.

The crown portion of the present invention is preferably made from two aft and two forward crown patterns, each comprising one or more plies, preferably six plies of unidirectional fibers. A transverse extension of one of these, preferably the outer aft crown pattern, is sufficient to wrap entirely around the steel steerer tube and provide overlapping edges on the opposite side thereof. The width of the overlap provided by this wrap-around extension is at least one-half inch, preferably ¾ to two inches, more preferably 1¼ to 1¾ inches. During the molding process, an integrally uniting juncture is formed by these overlapping edges to securely lock the flared foot of the steerer tube within the crown structure. The wrap-around extension preferably extends around the base portion of the steerer tube from adjacent the foot up to the bearing member for engaging the head tube of the bicycle frame.

One advantage of the fork structure of the invention therefore is that loads are transferred from the fork blades to the steerer tube gradually and over a much larger crown area than with conventional fork designs. The resulting composite fork is substantially stronger than either conventional forks of the steel/aluminum composite type or a fiber/resin prototype made in accordance with the invention but having a cylindrical steerer tube without a radial foot or skirt at its base. This was demonstrated by fatigue testing with cyclic fore and aft loading. The fiber/resin/ steel composite fork made as a prototype (fiber/resin blades joined by a fiber/resin crown to a steel steerer tube with a cylindrical base) failed after approximately 15,000 cycles. An aluminum/steel composite fork, such as shown in FIG. 1, failed after approximately 30,000 cycles. In comparison, a fiber/resin/steel composite fork having a steel steerer tube with a flared foot according to the preferred embodiment of the invention did not fail after 100,000 cycles. The preferred composite fork of the invention was 17% lighter than the composite steel/aluminum fork (1.0 lbs. vs. 1.2 lbs.).

Other differences of the present invention over the prior art which are believed to contribute to improved performance are a greater blade divergence from the crown to the front wheel axle relative to the steerer tube axis, and a greater distance from the apex between the fork blades at the lower surface of the crown to the head tube bearing seat. With respect to the angle of blade divergence from the steerer tube axis, the preferred angle of the present invention is 5.5 degrees, whereas the angle of FIG. 1 is 4 degrees and the blade angle of a conventional all steel fork is 3 degrees. In a metal fork, the primary reason to angle the blades is for aesthetics and to insure a proper wheel clearance. In the invention, greater blade angles mean less bending of the structural fibers within the crown, which in turn means a greater load carrying capability. In addition, it is believed that greater blade angles form a more efficient triangle for handling greater out-of-plane bending loads.

Based on actual road testing of the composite fork of the invention versus the steel/aluminum composite fork, it is believed that the compliance and other road handling characteristics of a bicycle equipped with the invention are superior to those of a bike equipped with the steel/aluminum composite fork. While not intending to be bound by any given theory, it is believed that the fiber/resin/steel composite fork has improved torsional and lateral flexure characteristics and improved vibration damping and resonance characteristics which enable the contact patch of the front tire to maintain better adhesion to the road surface through a wider range of operating conditions. The composite fork of the invention therefore is lighter and stronger, has improved performance characteristics, and is more adaptable to aerodynamic styling than conventional forks.

With respect to the apex to bearing seat distance, conventional fork designs maintain this distance in the range of about 14 to 20 millimeters (mm), even though tires have gotten smaller in cross sectional diameter in recent years. In the present invention, this distance is preferably increased to about 32 mm, while maintaining sufficient tire clearance. It is believed that this increased length of the crown base, along with longer crown legs and greater divergence of the fork blades from crown to wheel axle, contributes significantly to the increased overall strength and improved performance of the fork structure.

Each composite fork of the invention has a generally hollow unitary component comprising two symmetrical blade portions and an interconnecting crown portion. This unitary component has a unitary wall molded from composite materials to produce a generally hollow structure which does not require for its structural integrity any internal structural elements extending transversely across the interior cavity defined by this unitary wall. The unitary wall includes at least one integrally uniting juncture wherein corresponding areas of at least two adjacent wall sections, each comprising at least one piece of resin impregnated fibrous material, have been overlapped and then molded together, preferably under pressure, to provide a substantially continuous wall of this composite material extending around the hollow interior cavity of the unitary component. The at least one molded juncture may extend longitudinally along the length of each blade portion to integrally unite overlapped edges of two opposing wall sections to form a generally hollow blade. Alternatively, the at least one molded juncture may be a circumferential juncture integrally uniting one or both of the generally hollow blades to the generally hollow crown portion which connects the blades to the steerer tube.

Each of the overlapped wall sections or pieces comprises at least one molded layer of fibrous material impregnated with a synthetic resin. A wide range of different fiber mixtures may be selected for the fiber/resin portion of the structure, depending upon the specific performance characteristics desired. These characteristics include stiffness, compliance, tensile strength, compressive strength, vibration damping and the like. The fibrous material comprises structural fibers preferably of the unidirectional type and these may include carbon fibers, glass fibers, polyethylene fibers such as "SPECTRA" fibers, aramid fibers such as "KEVLAR" fibers, and other structural fibers usable for reinforcing synthetic resins used to make composite materials. "KEVLAR" is a trademark of DuPont for its proprietary aromatic polyamide fibers. "SPECTRA" is a trademark for polyethylene fibers which are available from the Allied Fibers Division of Allied Signal, Petersburg, Virginia.

The fibers of the fibrous material may be either woven or unwoven fibers, unidirectional unwoven strands being preferred. It is also preferable for these strands to be arranged in multiple layers or plies. Different plies may extend in different directions and may comprise different types of fibers and/or fiber compositions. Although high grade carbon fibers having a modulus of about 20 to 60 MSI, more preferably 40 to 50 MSI, are preferred, other types and combinations of structural fibers may be used. One such composition may comprise one-third polyamide glass fibers, one-third (Kevlar 49) fibers, and one-third carbon fibers. The preferred fibrous material is a non-woven fabric having multiple plies of unidirectional carbon fibers with the longitudinal axes of the fibers in different plies extending in different directions, such as longitudinally along the major axis of the piece cut from this fabric and 30° on either side of this major axis. These unidirectional carbon fibers are actually substantially continuous filaments having diameters in the range of about 5 to 7 microns. In this specification, if an interrupted fiber overlaps an adjacent fiber by at least 1-inch, preferably 2-inches, it is considered "substantially continuous"

because sufficient stress transfer will occur between the adjacent overlapped fibers.

The synthetic resins include heat curable epoxies, as well as other moldable and curable resins reinforceable by structural fibers to make composite materials. In this specification, the term "composite materials" refers to such structural fibers impregnated with a compatible synthetic resin for making a molded structure of resin impregnated fibrous material. The synthetic resin is preferably heat curable, such as an epoxy type resin with a heat activatable hardener component. Such composite materials of fiber and synthetic resin are available as large sheets of "prepreg", in which the resin remains in an uncured state until the hardener component is activated by heat or the addition of a separate activating agent. Such prepreg materials may be obtained from the Fiberite Company, which provides a prepreg in which the resin is curable in the range of about 150°-350° F. The curing temperature preferably is not more than 250° F. where aluminum fork ends are molded in place at the time the fork itself is molded, in order to avoid heat damage to these light metal parts.

The resin content of the composite material is preferably in the range of about 30-50%, more preferably about 32-39%, and most preferably about 33-36%. All percentages given in this specification are by weight unless otherwise specified. The prepreg most preferred for the present invention consists essentially of substantially continuous unidirectional carbon fibers impregnated with a heat curable epoxy resin and weighing about 290 grams per square meter, of which about 35% by weight represents the resin content and about 65% by weight represents the fiber content.

In this specification, "integrally united" means that an edge portion or other area of a first section or piece of resin impregnated fibrous material was placed in overlapping contacting with an edge portion or other area of a second section or piece of resin impregnated fibrous material, and that at least one of the first and second sections or pieces was cured by a substantial amount after being so overlapped. Preferably, both the first and second sections or pieces are cured by a substantial amount after being so overlapped. The amount of the overlap for a longitudinal blade juncture and a longitudinal juncture between crown patterns is preferably at least about one-fourth inch, and more preferably is in the range of about one-fourth inch to one-half inch. The amount of overlap for a transverse juncture between a crown pattern and a blade pattern is preferably at least two inches, more preferably at least four inches. In addition, either the front or rear crown pattern preferably extends all the way around the steerer tube and overlaps itself by at least ½ inch, preferably at least ¾ to 2 inches, more preferably 1¾ to 1¾ inches.

In this specification "meldedly bonded" means that an uncured section or piece is integrally united to another uncured section or piece during the molding process. "Moldedly bonded" means an uncured section or piece is integrally united during the molding process to a section or piece which either is uncured or has been pre-cured by a substantial amount before the molding process. A "molded" juncture therefore may be either meldedly or moldedly bonded. "Adhesively bonded" means a cured section or piece is joined to another cured section or piece, respectively, by a layer of an adhesive composition, which was applied in an uncured state and then cured to perfect a joint between the two previously cured sections or pieces.

Preferably, at least one tubular blade portion and the generally hollow crown portion are formed together and integrally united by at least one molded juncture between overlapped circumferential edges to provide a unitary fork assembly. More preferably, both tubular blade portions are integrally united to the generally hollow crown portion by molded junctures between overlapped circumferential edges so that the crown portion forms an integrally uniting hollow common junction between the two generally hollow blade portions. However, while integrally uniting junctures between the blade portions and the crown portions are preferred, it is contemplated that the blade portions and the crown portion may be made separately and then fastened together into an assembled structure by other than integrally uniting junctures, such as by adhesively bonded stub and socket joints.

The combined crown and dual blade structure is preferably made by molding the resin impregnated fibrous material under pressure. A preferred method of molding this structure employs a female molding unit having two mold pieces, namely a forward top piece and an aft bottom piece which are hinged together along one side thereof so as to open and close like a clam shell. The forward and aft mold pieces have molding cavities corresponding to the outline of the geometry of the crown and blades as viewed from the front and rear sides, respectively. Each of the molding cavities also has portions corresponding to the steerer tube, and a pair of air connectors, one at the lower end of each of the blade portions of the molding cavity.

For molding the crown and blades, at least two continuous pieces are cut from a sheet of resin impregnated fabric, and one of these are laid up in each of the mold pieces or halves. Each of the half-mold lay-ups may comprise more than one continuous piece of prepreg. Preferably, the layup of composite material in the forward mold-half comprises right and left blade patterns and large and small crown patterns, and the lay-up in the aft mold half comprises a pair of right blade patterns, a pair of left blade patterns and large and small crown patterns. The blade patterns are each a continuous strip cut from a larger sheet of resin impregnated fabric, and each of the crown patterns is a continuous patch cut from a larger sheet of resin impregnated fabric. The fabric from which each of these patterns is cut may have various thicknesses depending on the performance characteristics desired in the end product. For example, each pattern may have a thickness in the range of about 30 to 60 mils, about 50 mils being preferred and about 42 mils being most preferred.

The fabric may have one or more plies of fibers, the fibers in each ply preferably being unidirectional and the unidirectional fibers of different plies preferably extending in different directions. In the most preferred fabric composition for the blade patterns, the first ply of fibers extends along the axis of the blade (the zero axis), the second ply extends 30 degrees to a first side of the zero axis, the third ply extends 30 degrees to a second side of the zero axis, the fourth ply extends 30 degrees to the second side of the zero axis, the fifth ply extends 30 degrees to the first side of the zero axis and the sixth ply extends along the zero axis in the same direction as the first ply. This arrangement is known as a symmetric laminate relative to a neutral axis. The four crown patterns are preferably made from the same fabric as the blades, except that the zero axis of the large crown pattern extends in the direction of the width of the large crown patterns so as to be perpendicular to the steerer tube axis when placed in the mold.

It is also contemplated that, instead of using prepreg fabric, the plies of material may be laid up separately and successively in the mold with each ply being impregnated with resin prior to placement of the next successive ply of fibers. Other methods of forming the uncured crown and blade portions also may be utilized. For example, the blade portions may be preformed around a mandrel by wrapping elongated strips of prepreg around a solid mandrel component shaped to be the approximate size and shape of the desired hollow volume within the finished blade portions. The elongated strips may be either longitudinally folded or spirally wound around the mandrel. If folded longitudinally, only one longitudinally extending juncture is needed to integrally unite a single pair of overlapped edges in a region opposite to the region of the longitudinal fold. Where the strips of prepreg are spirally wound, at least two successive layers are preferred wherein the windings of the respective layers are in opposite directions and each winding is preferably about 1 to 4 inches, more preferably 2 inches, in width. Preferably, the windings of the strip in the same layer are not overlapped at the edges in order to insure an even surface finish.

Where a mandrel is used for preforming the blade portions, the outside diameter of the mandrel corresponds approximately to the finished inside diameter of the blade along its length. The number of prepreg layers wrapped around the mandrel depends upon the thickness of each layer which in turn depends upon the number of plies of fiber in each layer, as well as the final desired wall thickness of the blade being wrapped. Thus, only a single layer of prepreg may be desired where a longitudinal wrap is used, whereas at least two layers will be required where spiral wrapping is used. For example, a single layer of prepreg with eight plies of fibers will produce a wall thickness in the finished blade of about 50 mils. Similarly, a spiral winding of a prepreg strip having four plies in each layer for a total of eight plies with two spiral windings in different directions will produce the same wall thickness in the finished blade. Following the wrapping and forming around the mandrel, the tubular portions are slid axially off of the mandrel and placed in the mold instead of using flat blade patterns in each half of the mold as described hereinbelow.

The uncured shell for the crown and blade portions of the fork are laid up in the mold preferably as follows. The large and small crown patterns are laid up first in both the front and rear mold halves. The right and left blade patterns are then laid up in both mold halves so as to extend well into (over) the crown patterns. Instead of using these separate blade patterns, right and left blade shells preformed on mandrels as described above may be placed in the lower (rear) mold half so as to overlap the crown patterns in the same fashion. The steel steerer assembly is then placed in position in the mold with the flared legs of the steerer tube base abutting against the crown patterns. The legs of the steerer tube base preferably are apertured and sandwiched between parts of the large and small crown patterns on one side and parts of the upper end portions of the blades on the other side.

Where separate blade patterns are used in each mold half, the blade patterns for one of the mold pieces, preferably the bottom piece are cut so that the resin impregnated fibrous material extends beyond the edges of the mold cavity so as to provide the excess material needed to form two opposing, longitudinally extending junctures of about the same width by overlapping adjacent longitudinal edges of the upper and lower blade patterns when the mold pieces are closed and clamped together while the resin is tacky and substantially uncured. One set of the crown patterns, preferably the lower patterns, are similarly provided with an excess of material to form a similar pair of opposing longitudinally extending junctures of overlapped edges. The width of the excess material along the edges of preferably the lower patterns is preferably about ¼ to one inch, more preferably about one-half inch to ¾ inch so as to produce an integrally uniting juncture of about the same width.

Regardless of whether the shell for the blade portions are laid up as separate blade patterns or as a blade preform, the upper end portion of the blade shells overlap the lower end portions of the crown shell for a substantial distance so as to form an integrally uniting transverse juncture between each of the blades and the crown portion. These junctures are formed by overlapping the transverse edges of the upper blade ends with the prepreg material of the respective crown legs. These transverse edges are overlapped by at least one inch, preferably at least two inches, and more preferably at least 4 inches.

In the preferred embodiment, an inside portion at the upper end of the blade overlaps the large crown pattern by at least about 2 inches and the small crown pattern by at least about ½ inch, and an outer portion of the upper blade end overlaps the large crown pattern by at least about 3 inches and the small crown pattern by at least about 1 inch. In addition, an area of the inner part of each upper blade end preferably extends through an aperture in the steerer tube leg and is moldedly bonded therethrough with an opposing area of the small crown pattern, which in turn is moldedly bonded to the large crown pattern. The resulting molded juncture through the crown leg is preferably at least 0.15 square inches, more preferably at least 0.20 square inches.

It is believed that the overlapped edges of the patterns and the overlapped areas through apertures in the steerer tube assembly, when cured under pressure, will yield a structural continuity of unidirectional fibers within and across the resulting junctures. This continuity provides a sufficiently integral structure to transfer stress loadings from fiber to fiber across the junctures and past the overlapped areas into the corresponding pieces or sections of cured resin impregnated fibrous material. Where both of the sections having overlapped areas are uncured so that melded bonding takes place, it is believed that the temperature and pressure applied during molding of the juncture cause the resin matrixes of the overlapped areas while in a fluid state to flow and intermix in between adjacent fibers of the respective sections or pieces and some of the fibers of the respective sections or pieces to commingle with each other within an intermixed volume of these matrixes. Because such fiber to fiber stress transfer is less efficient where an edge or other part of an uncured section of prepreg is overlapped with a previously cured component made from the same prepreg (such as where the blade portions are partially or completely precured), the overlap may need to be increased to achieve the same stress transfer as in a meldedly bonded juncture, such as by ten to thirty percent of additional overlap.

Fiber to fiber stress transfer is highly desirable because carbon fibers and the like are capable of carrying much greater (by a factor of as much as 10 to 30) stress loadings than the resins with which they are impregnated. Thus, the overlapped areas upon curing provide integrally united pieces or sections of resin impregnated fibrous material so that the molded walls of the crown and blades which bridge the joints between the respective mold pieces are substantially continuous walls of resin impregnated fabric. Such substantially continuous walls of resin impregnated fabric also are provided by the overlapped transverse or circumferential edges between the respective blade portions and the crown portion. In their uncured state, the overlapped longitudinal edges and the overlapped transverse ends of the uncured pieces of prepreg also provide an expansion means for allowing free expansion of the fork shell of composite material so that all exterior areas of its walls can be firmly pressed against the walls of the mold and into any recesses therein by the pressing means used during the resin curing step of the molding process.

The overlapping edges of the prepreg patterns bridging the lines of abutment of the mold pieces may be pressed together by running a rod or other tool down each preformed shell portion before it is transformed by curing into the corresponding crown and blade portion. However, this is preferably accomplished by pressing means for continuously applying internal pressure to the crown and blade shell throughout the curing operation. One such continuous pressing means is one or more appropriately shaped bladders which are placed within the shell and then are pressurized with air after the entire fork has been laid up and the mold pieces have been fastened together to form closed molding cavities. This also may be accomplished by placing resilient foam shapes (cores) within the prepreg patterns, these shapes having dimensions larger than the interior dimensions of the mold so that when the mold is closed the resilient foam provides pressure for pressing the prepreg patterns against the mold surfaces. Another such continuous pressing means is a foamable resin composition which may be placed in the cavities within an uncured fork shell. Such resin compositions are available in solid, liquid or paste forms.

Improvements in the performance characteristics realized by the composite fork of the present invention are believed to be due, at least in part, to the intimate contact between the fibers of the respective overlapped edges of the continuous pieces of prepreg material used in forming the structure. This intimate contact is believed to be due to the continuous pressure which is applied to the overlapped edges as they are cured during the molding process to provide molded junctures of both the longitudinal and transverse types. Such intimate contact is also achieved between the layers of a preformed blade having spiral windings wound in symmetrically opposite directions. Improved performance also is believed to be due, at least in part, to the different orientations of unidirectional fibers in the different fiber plies. These orientations are selected to improve the strength of the blade and crown members for carrying both bending and torsional stresses.

Where blade portions of relatively small diameter are desired, these tube like portions may be further reinforced by providing a substantially rigid core of synthetic resin within the hollow tube interior. A pressing means capable also of providing such reinforcement is a heat expandable resin foam, such as styrofoam or polyurethane foam, the latter being preferred because of its resistance to heat and to degradation by petroleum type chemicals. Such internal reinforcement also may be provided by placing within the hollow interior of the tubular blade portions, a rigid plastic foam of unexpandable resin, preferably a light weight foam, surrounded by solid or liquid expandable layer or sleeve, such as may be formed from a heat expandable adhesive composition available in the form of a viscus paste or a solid sheet or strip. An expandable adhesive film of this type is available from Ciba-Geigy of Fountain Valley, California, under the trade name R-370B. This adhesive composition is expandable and cured in place so as to substantially fill that part of the hollow interior of the tubular blade portion between its interior surface and the exterior surface of a rigid plastic foam core of nonexpandable synthetic resin.

The advantage of a substantially rigid core of synthetic resin within a tubular blade portion is that the wall thickness of the blade portion may be reduced by as much as about thirty percent (30%) of the wall thickness without a resin core. For example, a tubular blade of resin impregnated fiber with a wall thickness of about 60 mils has about the same strength as a blade portion of the same material with a wall thickness of about 42 mils and filled with a substantially rigid core of synthetic resin. However, these alternatives are not preferred because the residual weight of the core materials is substantially more than the weight saving provided by the reduction in wall thickness. The blade portions of the fork preferably have a non-circular aerodynamic cross-sectional shape. This aerodynamic cross-sectional shape preferably is symmetrical and extends along a major portion of the length of the elongated blade portions, more preferably over substantially the entire length thereof. The crown portion of the fork also preferably is provided with a shape selected both for its strength and aerodynamic characteristics and this shape is symmetrical relative to the imaginary plane of the bicycle frame in which both the front and rear wheels rotate.

As previously indicated, the lower portion of the steerer tube assembly, including the depending legs thereof, are surrounded by the crown and blade portions of the forks and parts of this assembly are embedded in the substantially continuous and integral wall of the crown and blade portions. The metal inserts forming the lower fork ends for engaging the front wheel axle also may be embedded in this substantially continuous wall by molding the lower ends of the blade portions around these insert pieces. However, these inserts are preferably adhesively bonded in place after the preferred molding operation which uses two bladders, each having an inlet extension exiting the mold through a corresponding opening in the fork shell which later receives a fork end piece. However, other bladder routings could be used which would permit molding the fork end pieces in place during the molding operation. For example, one of the fork ends could be molded in place by passing a single bladder through the opening for the other end piece, then through transverse apertures in the base of the steerer tube, and then down the other blade to the position where the closed bladder end abuts the end piece being molded in place. Two bladders or a single Y-shaped bladder also could be run down the steerer tube and through apertures in the steerer tube base, one corresponding to each blade so that both fork ends could be molded in place.

While the clam-shell structure with two of these junctures in opposing relation is preferred for the blades, a single such juncture will produce a substantially continuous blade wall where a single elongated blade pattern of approximate shape and width is longitudinally folded around a bladder or other pressing means until its opposite edges overlap within the mold. In other words, two longitudinally folded strips of prepreg, one for each blade, may be laid up directly in the mold without use of a mandrel so that only one longitudinal extending juncture is required to form each of the blade portions. In this embodiment, no blade pattern is laid up in the upper half of the mold and the blade pattern in the lower half of the mold has sufficient excess material extending beyond the edges of the mold cavity to extend entirely around the bladder and the cavity of the upper mold half and then to provide overlapping edges of sufficient width to form a single longitudinally extending juncture. In this regard, it is contemplated that such a single longitudinally extending juncture could be positioned at any place around the transverse circumference of the molding chamber when the mold halves are closed. Similarly, the crown portion of the composite structure could be formed with a single juncture of overlapped edges by replacing the upper mold patterns of the crown with sufficiently wide extensions of the lower mold patterns of the crown.

It is also possible to assemble the entire resin/fiber composite portion of the fork structure outside of the mold, to place the bladders or other pressing means therein, and then place this separately formed shell in the mold and wrap the crown portion thereof around the base of the metal steerer tube assembly. Longitudinal junctures may be eliminated entirely by the spirally wrapped pre-formed blade shell described above.

The wall thicknesses of the molded crown portion versus the molded blade portions may be different depending upon the desired performance characteristics of each. In the preferred embodiment, the wall thickness of the crown portion is approximately twice the wall thickness of the blade portion, these thicknesses preferably being in the ranges of about 66 to 194 mils and 33 to 52 mils, respectively.

To improve the bonding between the metal components and the composite materials of the crown and blades, the metal components may be wrapped tightly with a strip or patch of resin impregnated fabric called a "scrim". Such a scrim may be used on the lower portion of the steerer tube and/or the upper portion of the metal fork ends and is preferably made of a prepreg having carbon, glass or other fibers impregnated with a heat curable epoxy resin.

As previously indicated, the overlapped longitudinal edges and transverse ends of the clam-shell type lay-up provide an expansion means allowing the walls of the uncured shell to expand fully so that all surface areas of the shell are firmly and uniformly pressed against abutting inside surfaces of the mold. If sufficient pressure is not exerted by the pressing means or if free expansion of the shell in response to this pressure is not allowed, the cured crown and/or blade portion of the fork may be defective in that it may not have the necessary structural strength or the desired exterior shape or the desired continuous and uniformly smooth surface finish.

In the preferred embodiment, the resin of the prepreg material is preferably heat curable and any expandable resins used are preferably heat activatable. After the fork shell is placed in the mold, the bladders are inflated to compress the layers of fiber and resin against the walls of the mold and the curing process is initiated by applying heat to the mold. Further compression of the layers of fiber and resin occurs as the pressure within any bladders and the pressure caused by expansion of any expandable foam cores increases as the temperature rises. When curing is complete, the fork is removed from the mold and any resin residues are trimmed off to provide a final fork product. Although the pressing means, whether inflatable bladders or expanded foam, may be removed by dissolution in an appropriate solvent, it is more economical to leave these in place. Accordingly, the inflatable bladders are preferred because they add relatively little weight to the final product as compared to foamed core materials. The crown and blade portions of the present invention may be molded in a single size for all sizes of conventional bicycles. This is because the distance between the apex on the underside of the crown and the front wheel axle is the same for all conventional bicycles. The only dimension that changes is the distance between the bearing seat carried by the steerer tube assembly and the connector for the handle bars. Thus, the length of the steerer tube may be chosen to be compatible with the largest conventional size of bicycle and then the top of the steerer tube may be cut off and threaded at different lengths in accordance with sizing adaptations well known in the industry.

BRIEF DESCRIPTION OF THE DRAWINGS

A better understanding of the invention and its advantages will be apparent from the detailed description below of specific embodiments taken in conjunction with the accompanying drawings in which:

FIG. 1 is a front elevational view of a prior art bicycle fork;

FIG. 2 is a front elevational view of a bicycle fork made in accordance with the present invention;

FIG. 3 is a fragmentary front elevational view similar to FIG. 2 but shown in section;

FIG. 4 is a fragmentary side elevational view in section taken along lines 4—4 of FIG. 3;

FIG. 5 is a fragmentary elevational view in section taken along line 5—5 of FIG. 3;

FIG. 6 is a fragmentary front elevational view similar to FIG. 2;

FIG. 7 is a fragmentary left side elevational view of the bicycle fork shown in FIG. 6;

FIGS. 8-20 are transverse sections of the fork taken along corresponding lines 8—8, 9—9, 10—10, 11—11, 12—12, 13—13, 14—14, 15—15, 16—16, 17—17, 18—18, 19—19, and 20—20, respectively, of FIG. 7;

FIG. 21 is a plan view showing a forward blade pattern;

FIG. 22 is a plan view showing a pair of aft blade patterns;

FIG. 30 is a diagrammatic illustration in cross-section of a modification to the foot portion of the metal steerer tube assembly;

FIG. 31 is a diagrammatic illustration in cross-section of a further modification to the foot portion of the metal steerer tube assembly;

FIG. 34 is a plan view of some of the blade and crown patterns laid up in a bottom mold piece;

FIG. 35 is a plan view of the steerer tube assembly and all fork patterns laid up in the bottom mold piece along with corresponding bladders;

FIG. 38 is a perspective view of a molded front fork assembly lying in an opened mold;

FIG. 39 is a diagrammatic illustration of a test set up for measuring forward and aft deflections of a fork assembly;

FIG. 40 is a diagrammatic illustration of a test set up for measuring lateral deflections of a fork assembly;

FIG. 41 is a diagrammatic illustration of a test set up for measuring torsional deflections of a fork assembly; and, FIG. 42 is a graph of test results from fore and aft deflection measurements of different fork assemblies.

DETAILED DESCRIPTION OF EMBODIMENTS SHOWN IN DRAWINGS

Figure 23:
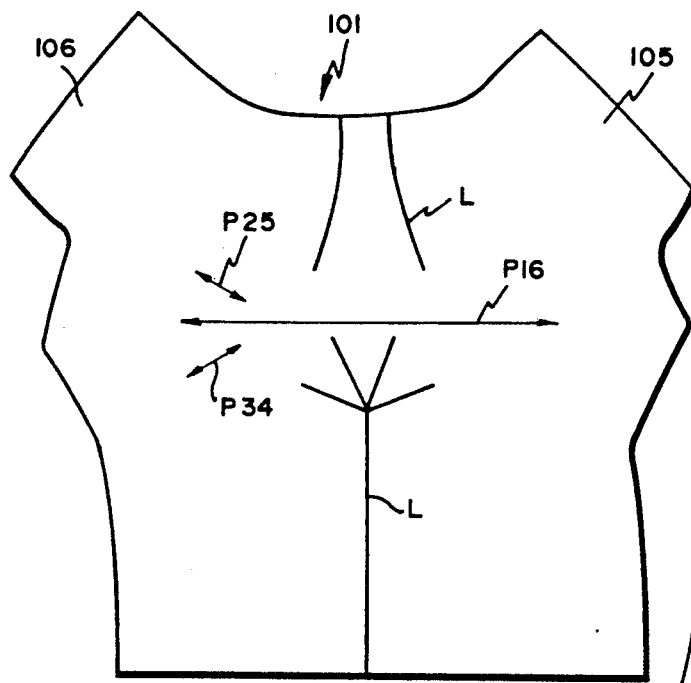
FIG. 23 is a plan view showing an aft outer crown pattern.

A conventional front fork 29 is shown in FIG. 1 of the drawings and comprises a pair of hollow blades 30—30 connected to a steerer tube 32 by an inverted Y-shaped crown 34. At the lower end of each blade is an aluminum insert forming a pair of fork ends 36—36, each of which has a slot or aperture 37 for receiving a corresponding end of the front wheel axle. The upper end of the metal steerer tube is threaded at 38 for connection to a steel nut or collar (not shown), which engages the upper end of the head tube of a bicycle frame (not shown) so as to secure the steerer tube in the head tube with the inner race 43 at the base of bearing collar 44 seated against the lower end of the head tube. The handle bars (not shown) are attached to the steerer tube by a stem which fits inside the steerer tube and is held in place by a wedge locking mechanism (not shown). An aperture 39 passes through both the lower end of the steerer tube and the base of the crown for receiving a bolt on which is mounted a front brake assembly (not shown).

In the structure of a conventional fork as shown in FIG. 1, the legs 40—40 of the crown 34 together with the crown base 41 define an overall crown length CL. A lower portion 42 of each leg 40 is received in a hollow upper end portion of the corresponding blade so that the blade overlaps the crown leg by distance defining a transition length TL. One such fork is made by Tange Industries, Ltd. The Tange fork has an overall crown length CL of about 2 inches and a transition length TL of about 0.75 inches. As also shown in FIG. 1, the center line C of each blade 30 diverges from the steerer tube axis A at an angle D, which in conventional blades has a value in the range of about 3 to 4 degrees.

In FIG. 2, there is shown a cycle fork 49 made in accordance with the present invention. This fork comprises a pair of hollow blades 50—50 connected to a steerer tube 52 by an inverted Y-shaped crown 53. At the lower end of each blade is an aluminum insert forming a pair of fork ends 56—56 which are secured in a socket in each blade end, either by being molded in place or by later application of an adhesive composition. Each of the fork ends has a slot or aperture 57 for receiving a corresponding end of the front wheel axle in the same manner as the ends of a conventional fork. The steerer tube and fork ends are made of a stiff (rigid) material, such as metal or an equivalent plastic material. Preferably, the steerer tube assembly is made of steel and the fork ends are made of steel or aluminum. The upper end of the steerer tube is threaded at 58 for connection to the head tube of a bicycle frame in the same manner as a conventional fork. An aperture 59 passes through both the lower end of the steerer tube and a base portion of the crown for receiving a bolt on which is mounted a front brake assembly (not shown) in conventional fashion.

In the structure of fork 49 as shown in FIG. 2, the legs 54—54 of the crown 53 together with the crown base 51 define an overall crown length CL', which is much longer than the crown length CL of the conventional fork of FIG. 1. Preferably, the entire length of each leg 54 of the crown forms a socket which receives a hollow upper end portion of the corresponding blade so that the blade overlaps the crown to provide a transition overlap for. by a distance defining a transition length TL', which also is much longer than the transition length TL of a conventional blade.

Also illustrated in FIG. 2 is the steerer tube center line A' and the blade center line C', which diverge from each other at an angle D' having a value preferably greater than 4 degrees, more preferably in the range of 4½ to 6 degrees, most preferably about 5.5 degrees. The angle D' of the present invention therefore is greater than the angle D usually employed in conventional bicycle forks. One very important difference between prior art forks and the embodiment of FIGS. 2 and 3 is that the main cylindrical body of steerer tube 52 extends all the way down to the base of the blades adjacent to the apex 55 of the inverted Y-shaped crown, and there the cylindrical base of the steerer tube is provided with an anchor means comprising an inverted U-shaped anchor member or strap 60 as shown best in FIGS. 2 and 3. The strap 60 provides a pair of depending legs 70—70 which are secured to parts of both the crown 51 and respective blades 50—50 as described hereinafter. In the conventional fork 29 of FIG. 1, the cylindrical base of the steerer tube 32 merely fits within a corresponding socket 33 which stops in the base 41 of crown piece 34 at a position well above the upper ends of each blade 30.

Referring now to FIGS. 3, 4 and 5, the steerer assembly 52 of the invention includes an upper tubular portion 61, preferably having a thickness of about 74 mils, and a lower tubular portion 62, preferably having an increased wall thickness up to about 100 mils. The upper tubular portion 61 and the lower tubular portion 62 of steerer assembly 52 are preferably provided by a CR-MO Spiral Fork Stem, such as is available from Tange Industries, Ltd., of Osaka, Japan. An annular bearing member 64 is carried by lower tubular portion 62 and has an axially extending barrel 65 and a radially extending flange 66, the upper (inner) surface of which forms a bearing seat for the head tube of a bicycle frame (not shown). To reduce the weight of the steerer tube 52, grooves 68 may be provided in the inner surface of lower tubular portion 62.

An upper end portion of each blade 50 comprises an inner sidewall 80 and an outer sidewall 82. Surrounding all of the upper blade portion is a large crown part 84 and surrounding only part of the upper blade portion is a small crown part 86. An outer section of small crown part 86 is laminated between a corresponding part of outer blade sidewall 82 and large crown part 84 as seen best in FIG. 3. Similarly, an inner section of small crown part 86 is laminated between an inner section of large crown part 84 and a strap leg 70. Thus, the inner blade wall 80 and the large and small crown parts 84 and 86, respectively, form a substantially continuous wall which encloses and engages the lower portions of legs 70-70 of strap 60 to mechanically lock the crown and blade component to the steerer tube 52. To further secure both large crown part 84 and inner blade wall 80 to strap leg 70, an aperture 88 is provided in strap leg 70 and an area 90 of inner blade wall 80 is bonded to a corresponding area of small crown part 86, which in turn is bonded to a corresponding area of large crown part 84. Although adhesive bonding could be used, this bonding is preferably molded bonding, more preferably melded bonding, under pressure to provide a pressure molded juncture integrally uniting the walls of the blade, the small crown part and the large crown part.

To insure a secure connection between an intermediate part of the steerer tube adjacent bearing member 64 and the upper ends of both the large crown part and the small crown part, an annular ring 92 is provided by packing and then curing a liquid adhesive composition at the upper end of hollow crown chamber 95 adjacent to the underside of flange 66 of bearing member 64. Adhesive ring 92 therefore adheringly connects the upper ends of the large and small crown parts to the underside of bearing member 64 and to an axially extending mid-portion of the outer surface of lower steerer tube portion 62. Adhesive ring 92 is preferably at least 200 mils thick at its smallest dimension in the direction parallel to steerer tube axis A'. A prepreg scrim of resin impregnated carbon fibers, represented by broken lines 97—97 in FIG. 3, may optionally be wrapped tightly around the lower end of the steerer tube between bearing member 64 and foot strap 60 in order to improve adhesion between the composite crown and the respective fore and aft surfaces 104 and 107 of the corresponding portion of the steerer tube.

The aperture 59 for mounting the brake assembly is positioned approximately halfway between bearing member 64 and the apex of strap 60 and contains an aft metal grommet 94. As best seen in FIG. 4, a forward metal grommet 96 also is provided in aperture 59.

Large (outer) crown part 84 preferably comprises a forward large crown pattern 100 and an aft large crown pattern 101. Similarly, small (inner) crown part 86 preferably comprises a forward small crown pattern 102 and an aft small crown pattern 103 as seen best in FIGS. 4 and 5. As will be described more fully later, aft large crown pattern 101 preferably has a pair of laterally extending flaps 105 and 106 which extend entirely around lower steerer tube portion 62 so as to overlap each other on the forward side of the steerer tube assembly behind forward small crown pattern 102. A layer of adhesive 108 of varying thickness also may be adjacent to and extend around lower steerer tube portion 62 beneath bearing member 64. The radial thickness of this adhesive layer would be reduced significantly by the scrim 97 which is optional and is not shown in FIG. 4. The radial thickness of adhesive layer 108 may be further reduced by filling the space between the inner crown patterns and the fore and aft surfaces 104 and 107, respectively, with additional patches of prepreg serving as shims.

The overlap between flaps 105 and 106 of the aft large crown pattern 101 is also shown in FIG. 18 wherein the width of this overlap is shown by arrow OL. The width OL is preferably at least 0.75 inches, more preferably at least 1.5 inches, and most preferaby 2.0 to 3.0 inches. Where a pressing means, such as a bladder, is provided in the respective right side and left side crown chambers 93 and 95, these pressing means preferably provide sufficient pressure on the overlapped edge portions 105 and 106 to form a pressure molded juncture 160 (FIG. 19) of width OL.

As seen best in FIG. 5, the forward and aft small crown patterns 102 and 103 are preferably overlapped and integrally united by a pressure molded juncture 110 extending along opposite sides of the crown. Similarly, blade portion 50 may be made from one or more blade patterns integrally united by one or more pressure molded junctures. In the preferred embodiment made in accordance with the preferred method described hereinafter, blade 50 comprises a forward blade pattern 112 integrally united by pressure molded juncture 114 to an aft blade pattern 115. Preferably, the opposite edge of forward blade pattern 112 is integrally united by a second pressure molded juncture 116 (FIG. 13) to a second aft blade pattern 117, which in turn is integrally united to the other aft blade pattern 115 by a third pressure molded juncture 118.

The structural details of the preferred fork ends 56—56 are shown in FIG. 6. Each fork end comprises a head 120 with the slot 57 for receiving a corresponding end of a front wheel axle (not shown). Carried by head 120 is a mounting pin 122 which extends upwardly into a corresponding socket at the lower end of each blade 50. Near the upper end of pin 122 is a groove 124 for receiving extra adhesive to help lock fork end 56 in the lower end of blade 50. As an alternative, fork end 56 may be mounted in the mold and the lower end of blade 50 molded around pin 122, in which case molded resin and fibers flow into groove 124 to securely lock the fork end in position. Where fork end 56 is molded in place, the lower portion of pin 122 below groove 124 may be surrounding by a fiberglass and resin scrim to aid in bonding the metal pin to the composite material wall of blade 50. Pin 122 preferably has a length of 1.25 inches and a diameter of three-eighths inch. Groove 124 is preferably one-eighths inch wide and one-sixteenth inch deep.

As seen best in FIG. 7, a lower end portion of each blade 50 is raked forwardly of steerer tube axis A' by a distance R, which preferably is in the range of about 1.5 inches (38 mm) to 1.97 inches (50 mm), more preferably about 1.73 inches (44 mm), as measured along a line 126 extending perpendicular to steerer tube axis A' and passing through the front wheel axis 127 within slot 57 of fork end piece 56. The forward rake also may be specified by an angle R' between the steerer tube axis A' and the axis P of pin 122.

The transverse diameter and the cross-sectional shape of the blades 50 and the crown structure 53 may change constantly from one end of these components to the other. The preferred cross-sectional shapes of the blade and crown structures are illustrated in FIGS. 8–20. In FIGS. 8–19, lines have been included to illustrate the overlapped edges of the blade and crown patterns, which are preferably integrally united by pressure molded junctures. The overlapped edges are presented only diagrammatically because after the preferred molding process, it is believed that the boundaries between these edges become indistinct because of the melded bonding which causes the resin matrices of the overlapped edges while in a fluid state to flow and intermix in between adjacent fibers of the respective edges. Some of the fibers of the respective edges may actually commingle with each other within the intermixed volume of the fluid matrices.

Only a single pair of overlapped edges has been shown in FIG. 14 to indicate that alternative embodiments of the invention may utilize only a single blade or crown pattern which can be folded around a pressing means so as to create opposing sections of a single pattern of prepreg material. In this construction, only a single pressure molded juncture 129 is required to integrally unite the opposing sections of a single pattern piece.

When cut as strips from a larger sheet of prepreg and laid-out flat, the forward blade pattern 112 preferably has the shape shown in FIG. 21, and the aft blade patterns 115 and 117 preferably have the shape shown in FIG. 22. The rearward most edge of each blade 50 is more sharply rounded than the forward most edge and is preferably made by overlapping adjacent edges 131 and 132 of aft blade patterns 115 and 117 when these two patterns are placed in the bottom half of a clam-shell type mold. During the molding process, overlapped edges 131 and 132 form the integrally uniting juncture 118.

Each of the blade patterns is preferably cut as a strip from a larger sheet of prepreg having six layers or plies of unidirectional fibers. The unidirectional fibers of plies 1 and 6 preferably lie parallel to the axis of the blade, which is represented by arrow P16. The unidirectional fibers of plies 2 and 5 are preferably at about plus 30 degrees relative to the blade axis as represented by arrow P25. The unidirectional fibers of plies 3 and 4 are preferably at about minus 30 degrees relative to the blade axis as represented by arrow P34.

Figure 24:
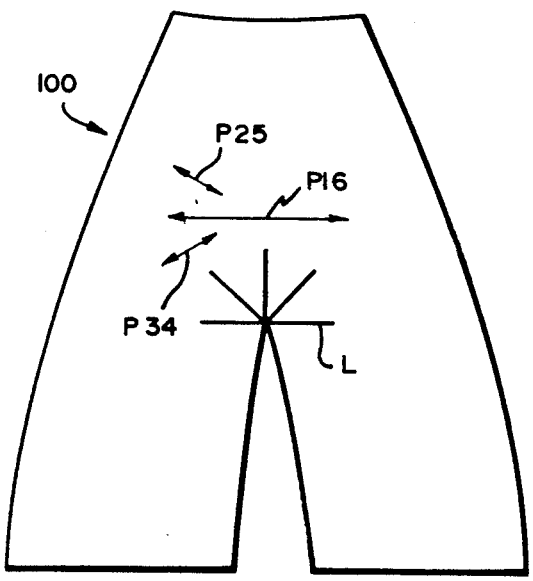
FIG. 24 is a plan view showing an outer forward crown pattern.

The shape of the large forward and aft crown patterns when cut as patches and laid-out flat are shown in FIGS. 23 and 24. These patterns are cut so that the unidirectional fibers of plies 1 and 6 extend perpendicular relative to the steerer tube axis as indicated by arrow P16. The unidirectional fibers of plies 2 and 5 slant upwardly at about plus 30 degrees relative to plies 1 and 6 as shown by arrow P25, and plies 3 and 4 slant down at about minus 30 degrees relative to plies 1 and 6 as shown by arrow P34 in FIGS. 23 and 24. The internal lines L in patterns 100 and 101 represent slits in the prepreg fabric to permit proper positioning of the patterns within a mold.

Figure 25:
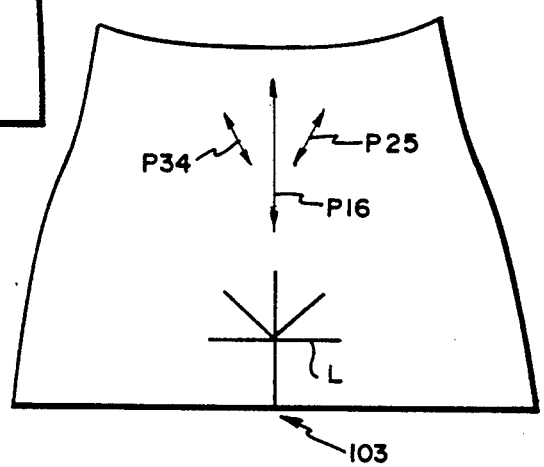
FIG. 25 is a plan view showing an aft inner crown pattern.
Figure 26:
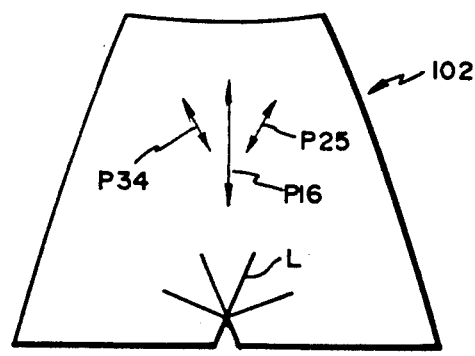
FIG. 26 is a plan view showing a forward inner crown pattern.

In the patches cut as the small crown' patterns of FIGS. 25 and 26, the unidirectional fibers of plies 1 and 6 are parallel relative to the steerer tube axis as represented by arrow P16. The unidirectional fibers of plies 2 and 5 extend at about an angle of plus 30 degrees relative to the fibers of plies 1 and 6 as indicated by arrow P25. The unidirectional fibers of plies 3 and 4 extend at about minus 30 degrees relative to the fibers of plies 1 and 6 as indicated by arrow P34. The cut lines L in the small crown patterns are for the same purpose as the cut lines L in the large crown patterns In all of the blade and crown patterns, the prepreg material preferably consist essentially of unidirectional carbon fibers impregnated with an epoxy resin. The preferred prepreg with six plies weighs about 1600 grams per square meter, of which about 35% by weight is the resin and the remainder of about 65% by weight is carbon fiber.

Figure 27:
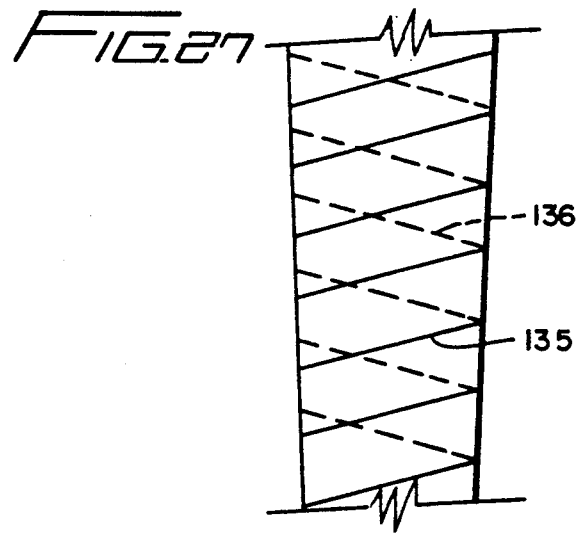
FIG. 27 is a fragmentary elevational view of a blade having spiral windings instead of the blade patterns of FIGS. 21 and 22.

Instead of making the crown and blade portions from precut patterns of prepreg fabric, one or both of these portions may be made using long strips of prepreg material of a uniform width, preferably one-half to two inches, more preferably about one inch, and winding these elongated strips around an appropriately shaped mandrel to provide a wall of composite material comprising at least two overlapped layers (each of multiple plies) formed by winding a continuous strip first in one direction and then in the opposite direction as shown in FIG. 27. In FIG. 27, the solid transverse lines 135 represent an outer spirally wound layer and the broken transverse lines 136 represent an inner spirally wound layer wherein the outer layer is wounded in the opposite direction from the inner layer. To insure a smooth outer surface of such spirally wound components of composite material, the windings of the same layer, whether outer or inner, are not overlapped along their edges.

Figure 28:
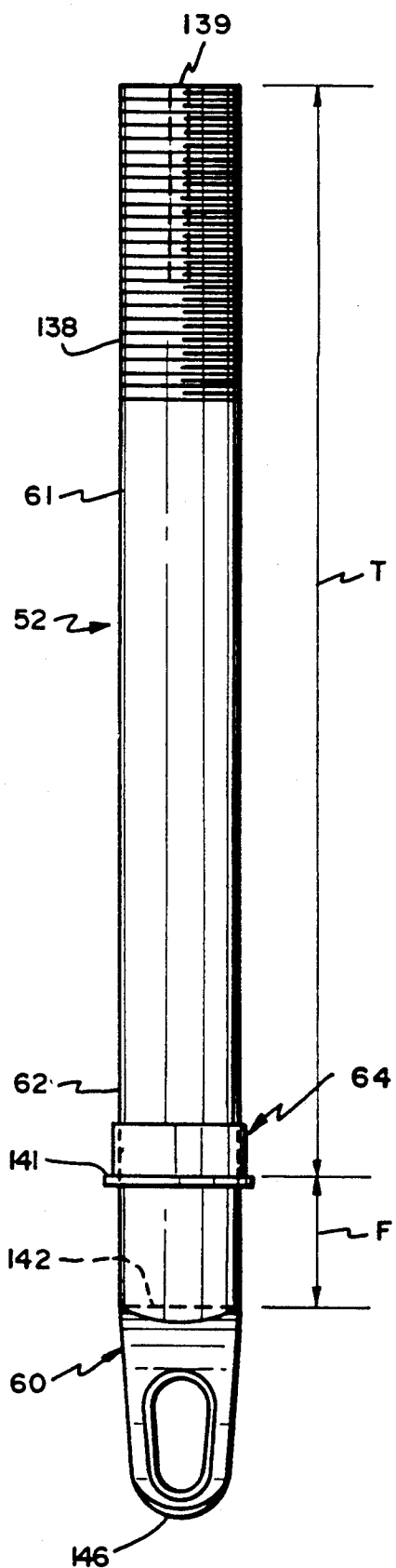
FIG. 28 is a side elevational view of a metal steerer tube assembly.

After formation in an uncured state but with the appropriate general shape, each spirally wound component is removed from its mandrel and then may be placed in a mold similar to that described below for use with the blade and crown patterns. Appropriate pressing means, such as a bladder, may be pulled through the uncured spirally wound shapes, and then the shapes assembled with the upper ends of the blades within sockets of the corresponding crown structure so that the final lay-up corresponds generally to the arrangement of the blade and crown components shown in FIG. 3. p In FIG. 28, there is shown the steerer tube assembly 52. The upper portion 61 of the steerer tube has a threaded section 138 and a compression slot 139 in accordance with conventional practice. The steerer tube has a nominal outside diameter of about one inch. The distance from the inner race 141 of bearing ring 64 to the apex 142 of the inverted U-shaped strap 60 is preferably about one and one-half inches, this distance being identified by arrow F in FIG. 28. The combined length of upper steerer tube portion 61 and lower steerer tube portion 62 may be varied to make the fork assembly of the invention compatible with standard bicycle frames of different sizes. For example, the length T may be 145 mils for a 52-inch bike, 164 mils for a 54-inch bike, 183 mils for 56-inch bike, 202 mils for a 58-inch bike, and 221 mils for a 60-inch bike.

The pair of apertures 88—88 preferably have the shape shown in these figures, the shape preferably being provided by cutting the apertures on an inner radius I of about 236 mils and an outer radius 0 of about 197 mils. Each aperture preferably has a chamfered edge 144, which facilitates molding blade inner sidewall 80 through the aperture 88 and into molded bonding contact with small crown part 86 as previously described with reference to FIG. 3. Edges 146—146 at each end of strap 60 also are preferably chamfered for the same purpose.

Figure 29:
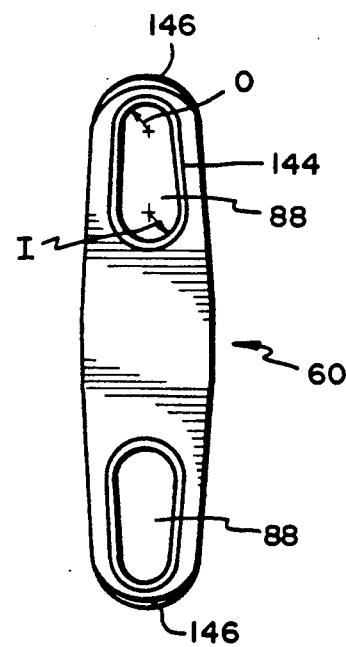
FIG. 29 is a plan view of a flat metal blank used in making the strap component at the lower end of the steerer tube assembly of FIG. 28.

Strap 60 is bent from the flat shape of FIG. 29 into the shape shown best in FIG. 3 before it is welded or otherwise secured to the lower end of steerer tube portion 62. More particularly, before the flat elongated piece of metal shown in FIG. 29 is attached to the lower end of the steerer tube, it is bent on a radius S (FIG. 3), preferably of about 685 to 690 mils, more preferably about 688 mils, until the depending legs 70—70 formed by the strap end portions are parallel to the blade center line C', which makes an angle D' of about 5.5 degrees relative to the steerer tube axis A' as shown in FIG. 3. The strap 60 is preferably stamped from a sheet of steel, preferably having a thickness of 70 to 100 mils, more preferably of about 88 mils.

As shown in FIG. 30 a solid forged piece 60' may be used in place of strap 60 which preferably is made from stamped metal. Both the strap 60 and the forged piece 60' are welded or otherwise rigidly secured to the lower end of the corresponding steerer tubes 62 and 62', respectively. Alternatively, as shown in FIG. 31, the lower end portion of a steerer tube 74 may be cut and deformed to provide a pair of integral depending legs 75—75 which serve the same function as depending legs 70—70 of strap 60.

Figure 32:
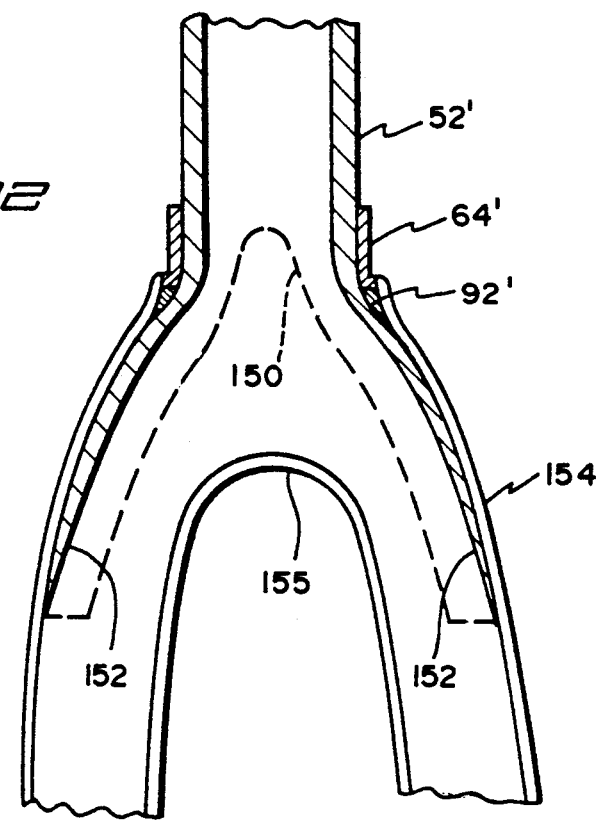
FIG. 32 is a diagrammatic illustration in cross-section of a modification of both the foot portion of the steerer tube assembly and the crown portion of the fork.
Figure 33:
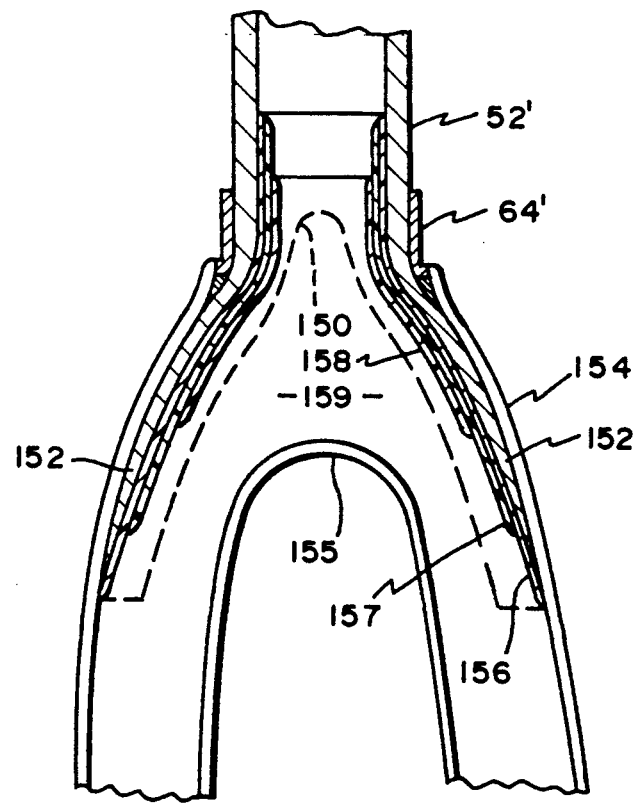
FIG. 33 is a diagrammatic illustration in cross-section of a modification of the steerer tube and crown structure of FIG. 32.

As shown in FIGS. 32 and 33, steerer tube legs similar to those of FIG. 31, may be further expanded and shaped to either side of an elongated pyramid-shaped slot 150 so as to form a flared skirt having a pair of depending legs 152—152 which engage an outer crown sidewall 154 instead of an inner crown sidewall, such as sidewall 76 as in FIG. 31. Mounted on the modified steerer tube 52' is a bearing member 64', and a ring of adhesive 92' is provided under bearing member 64' between leg 152 and outer sidewall 154. Since FIGS. 32 and 33 are diagrammatic only, the individual walls of the blade and crown patterns have been omitted with the understanding that these details may be similar to FIG. 3. For example, the upper portion of an outer blade sidewall may extend upwardly inside of depending legs 152—152 and be moldably bonded through one or more apertures in legs 152—152, similar to apertures 88 in strap 60, to the outer sidewall 154 as comprised of small and large crown patterns similar to small crown part 86 and large crown part 84 of FIG. 3.

The embodiment of FIG. 33 differs from that of FIG. 32 only in that the steerer tube legs 152—152 are reinforced by adhering to the inside surface thereof one or more additional pieces of prepreg material. FIG. 33 shows by way of example three superimposed pieces 156, 157 and 158 of prepreg material. Thus, pieces 156, 157 and 158 form part of a substantially continuous wall which encloses and engages the legs 152-152 to mechanically lock the crown and blade component to the steerer tube 52'. The three pieces of prepreg material may be replaced by curing in the same place a layer of correspondingly varying thickness made from a paste composition of structural fibers impregnated with a synthetic resin.

With respect to the composite material selected for reinforcing the inside of the metal steerer tube, it is preferred that the modulus of the unidirectional fibers be selected so that the modulus of the composite material as a whole matches the modulus of the metal as closely as possible. Otherwise, either the metal or the reinforcing composite is going to carry more than its share of the load, which may result in decreasing the useful life of the structure. Carbon fibers having a modulus of about 40 to 50 MSI are believed to be best in a composite material for steel steerer tubes which have a modulus of about 33 MSI. Lower modulus fibers would be appropriate for a steerer tube of aluminum which has a modulus of about 10 MSI.

To further improve the durability and performance of the modified structure of FIG. 33, apertures similar to apertures 88 in strap 60 may be provided in steerer tube legs 152—152 to provide means for integrally uniting reinforcing pieces 156—158 to crown sidewall 154 by means of a pressure molded juncture formed through each aperture. In addition, similar integral connections between the reinforcing pieces of prepreg and the fore and aft crown walls may be formed by extending the reinforcing pieces 156—158 completely across the inverted V-shaped slot 150 as shown, such that a bladder or other pressing means in crown chamber 159 will cause intimate contact between the reinforcing pieces and the fore and aft crown walls during the molding process. It also is contemplated that pieces 156—158 may stop at the edge of slot 150 or extend only partially thereacross.

As already indicated, FIGS. 32 and 33 are presented in diagrammatic form only, it being contemplated that the outer crown sidewall 154, the inner crown sidewall 155, the fore and aft crown walls and the blade walls may be assembled from crown and blade patterns and molded in the same fashion as the preferred crown and blade structures shown in FIGS. 2—30. The crown and blade walls of the modified structures of FIGS. 30 and 31 also may be made in the same manner. As a further alternative, the structures of FIGS. 3, 30 and 31 on the one hand and the structures of FIGS. 32 and 33 on the other hand may be combined in different ways, such as by providing the bearing member 64 of FIG. 3 with a skirt having depending legs such as legs 152—152 of FIG. 32 or the reinforced legs of FIG. 33.

The preferred method of molding the composite fork of the present invention will now be described with reference to FIGS. 34-38. In FIG. 34, there is shown in a bottom mold half 162 a partial lay-up comprising one pair of aft blade patterns 115 and 117, the upper portions of which lie on top of the aft small crown pattern 103, which in turn lies on top of aft large crown pattern 101. Although a second pair of aft blade patterns 115 and 117 will be laid up in left blade cavity 164, these patterns have been omitted from FIG. 34 in order to show more clearly left blade cavity 164. The broken lines 166—166 represent the opposing edges of the right blade cavity, the outer edges of patterns 115 and 117 extending beyond the cavity edges 166—166 in order to provide the excess material needed to form a pressure molded juncture as described hereinafter. The outer edge portion 165 of aft large crown pattern 101 and the inner edge portion 167 of this pattern below the end of the position for strap legs 70—70 also extend beyond the edges of the mold cavity to provide the material needed for pressure molded junctures at opposite sides of the crown. Neither the outer nor the inner aft crown patterns extend beyond the mold edge adjacent to the mold arch 163 for receiving strap 60 because the forward and aft patterns are in abutment under the strap 60 as shown in FIG. 4. Mold cavities 168 and 169 are provided for the steerer tube 52 and the annular bearing member 64, respectively. At the opposite end of blade cavities 164 and 166 are cavities 171 and 171, respectively, for receiving a bladder air connector as further described below.

In FIG. 35, there is shown the completely assembled bottom (aft) lay-up for forming the rearward half of the composite fork of the present invention. For clearity of illustration, the top mold half is omitted from this figure and a bladder 173 in the right blade lay-up is shown in its deflated condition and a bladder 174 in the left blade lay-up is shown in its inflated condition. Also shown in FIG. 35 is a pair of air connectors 176—176, each of which connects an air hose 177 to a corresponding bladder.

Figure 37:
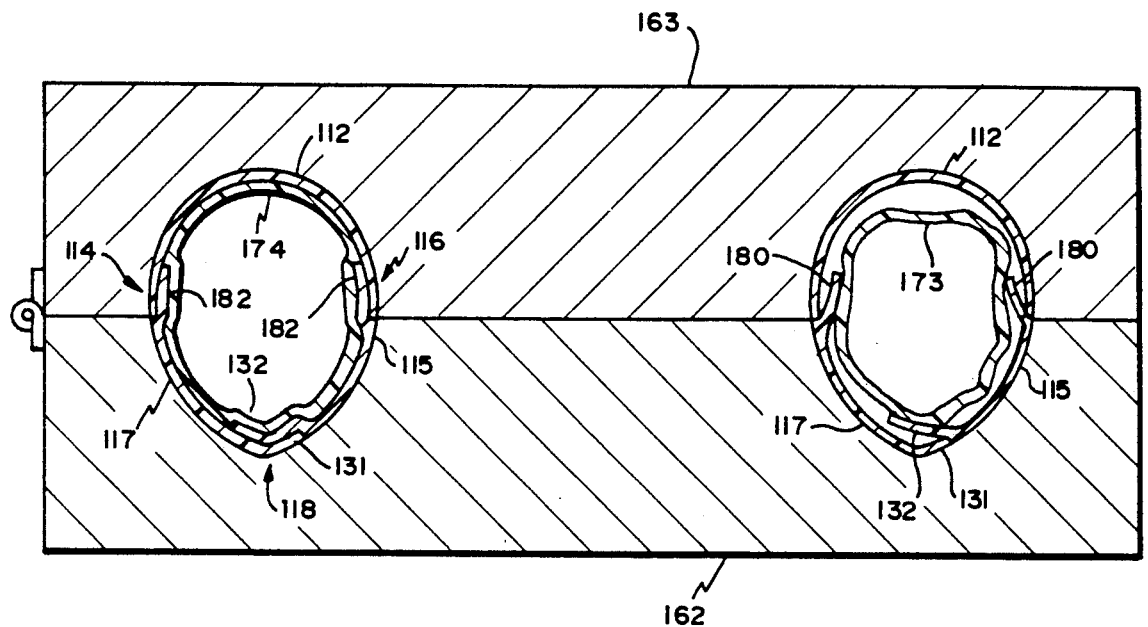
FIG. 37 is a cross-sectional view taken along lines 37—37 of FIG. 35 with the mold closed around the fork lay-up.

The right blade lay-up includes a pair of edge portions 180—180 and the left blade lay-up includes a pair of edge portions 182—182, both of these pairs of edge portions extending beyond the edges of the bottom (aft) mold cavities. The way in which these edge portions cooperate with the layups in the upper mold half to form pressure molded junctures is shown in FIG. 37 where the lower mold half 162 and upper mold half 163 are in their closed positions. Prior to closing the mold, edge portions 182—182 are folded over bladder 174 and edge portions 180—180 are folded over bladder 173 while each bladder is in its deflated condition. The mold is then closed and the bladders inflated so as to press the edge portions upward and outward against the upper blade patterns 112—112, as illustrated with bladder 174 in FIG. 37. Curing the composite material under pressure then forms the opposing pressure molded junctures 114 and 116. The overlapped edge portions 132 and 131 of aft blade patterns 115 and 117, respectively, also form a pressure molded juncture 118 extending longitudinally along the more sharply tapered rear edge of each blade 50. As shown in FIG. 37, and also in FIGS. 10-16, a major portion of the blade length preferably has an aerodynamic cross-section of a generally tear-drop shape.

Figure 36:
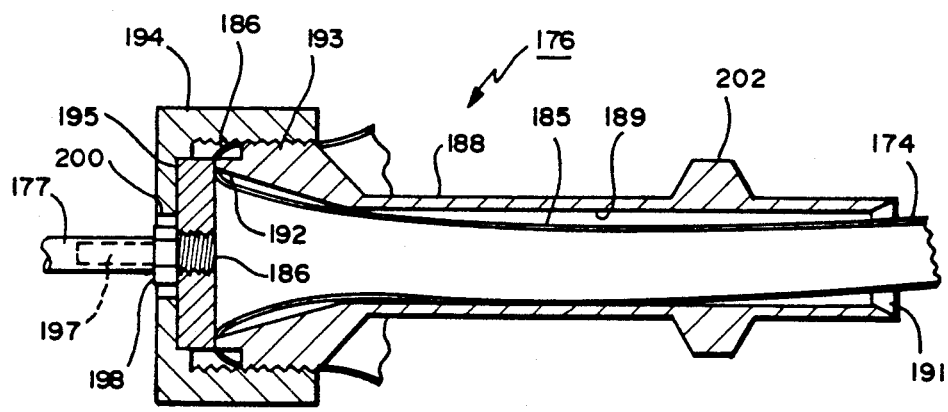
FIG. 36 is a cross-sectional view of the air connector for the bladders shown in FIG. 35.

The structural details of the air connectors 176—176 are shown in longitudinal cross-section in FIG. 36. The bladder 174 includes a conduit-like extension 185 extending between the working portion of the bladder and a free end 186 of the bladder. The air connector 176 includes a cylindrical body 188 defining an internal passageway 189. The bladder extension 185 is pulled through passageway 189 via inlet opening 191 and outlet opening 192, and then free end 186 is folded back over outlet opening 192 adjacent to an enlarged outlet flange 193. Free end 186 is clamped between a sealing washer 195 which is caused to bear against the end of opening 192 by the tightening of coupling 194, which has internal threads for engaging external threads on flange 193. Washer 195 has a threaded central opening 196 which receives the threaded end of an air hose nipple 197 which may be secured in aperture 196 by a lock nut 198. Air line 177 may be secured to nipple 197 by an adhesive or by a conventional hose clamp (not shown). The air connector may be modified by substituting for smooth coupling aperture 200 a smaller threaded aperture for directly receiving the threaded end of nipple 197. In this modification, washer 195 may be made of a resilient material, which may improve the air seal between coupling 194 and connector body 188. It also is possible to extend the length of free bladder end 186 so that it passes back over the threads of flange 193, although the arrangement shown is preferred to prevent the bladder end from interfering with the threading of coupling 194 on flange 193. The connector body 188 includes an annular collar 202 for engaging a corresponding groove in the top and bottom mold pieces to lock the connector assembly 176 securely in position within the mold.

In practicing the method of the present invention, the interior surfaces of the mold cavities in the top and bottom mold halves are first thoroughly cleaned and then a release agent is applied to these surfaces The crown and blade patterns, as cut from a larger sheet of prepreg material, are then laid-up in the bottom and top mold halves. The large crown patterns are laid-up first, followed by the small crown patterns, and then followed by the blade patterns.

The lower portion of the steerer tube assembly is preferably grit blasted and then degreased to improve adhesion between the metal and the composite material. An adhesive composition having the consistency of paste is then prepared and applied to the portion of the steerer assembly below the bearing member and to the corresponding crown area of the laid-up patterns in both mold halves. Before the steerer assembly is placed in the mold, the lower portion of the steerer tube below the bearing member may be tightly wrapped with a scrim of carbon fiber prepreg. Also small filler patches of prepreg may be placed between the curved fore and aft lower portions of the steerer tube and the fore and aft small crown patterns to serve as shims. The crevice-like spaces below bearing member 64 where the top of the crown pieces meet the steerer assembly are then filled with about a 200 mils thickness of the resin paste for forming adhesive ring 92. This adhesive is preferably product EA 9454 from the Dexter Hysol Aerospace and Industrial Products Division, Pittsburg, California 94565.

The free ends of two bladders, one for each blade, are then installed in the air connectors, and each of these bladder and air connector assemblies is then placed in a corresponding one of the two blade cavities of the bottom mold half. After the bladders are in place, the extended edge portions of the larger patterns in the bottom mold half are folded over against the top portion of each bladder, as necessary to provide the overlapped edges from which integral junctures are to be formed. The mold is then closed by pivoting the top mold half 163 on a pair of hinges 204—204 (FIG. 38), from a horizontal position adjacent to bottom mold half 162 to the superimposed position illustrated in FIG. 37. The two mold halves are then securely clamped together. Following closure and securing of the mold, the bladder fittings are connected to a supply of compressed air and the bladder is inflated, preferably to a pressure of at least 150 psi.

The mold containing the fork lay-up and inflated bladders is then placed in an oven and cured for about three hours at about 250° F. During the cure, the bladders preferably stay connected to the air supply to insure that adequate pressure is maintained. Following this cure, the mold is open as illustrated in FIG. 38, the air connectors 176—176 are disconnected, and the molded composite fork assembly 49 is removed from the mold. Any flashings of adhesive or residues are trimmed from the molded assembly as required.

The pins 122 of two aluminum fork ends 56—56 are grit blasted and degreased. Another batch of adhesive paste is mixed and then applied to the cleaned pins of the fork ends, and the pins 122 with adhesive paste thereon are installed in the hollow distal end of each blade. The added resin composition for securing the fork ends is then cured for about two hours.

Following installation of the aluminum fork ends, a hole is drilled through the crown in the fore and aft direction at a position perpendicular to the steerer tube axis and approximately half-way between the head tube bearing seat and the apex at the underside of the crown. Into the resulting brake mounting hole are inserted forward and aft steel grommets 94 and 96 for mounting a front brake assembly. These grommets are secured in position with the same adhesive paste as used on the fork ends and on the steerer tube assembly. After curing of the grommet adhesive for about two hours, the completed composite fork of the invention is ready for use.

Figure 42:
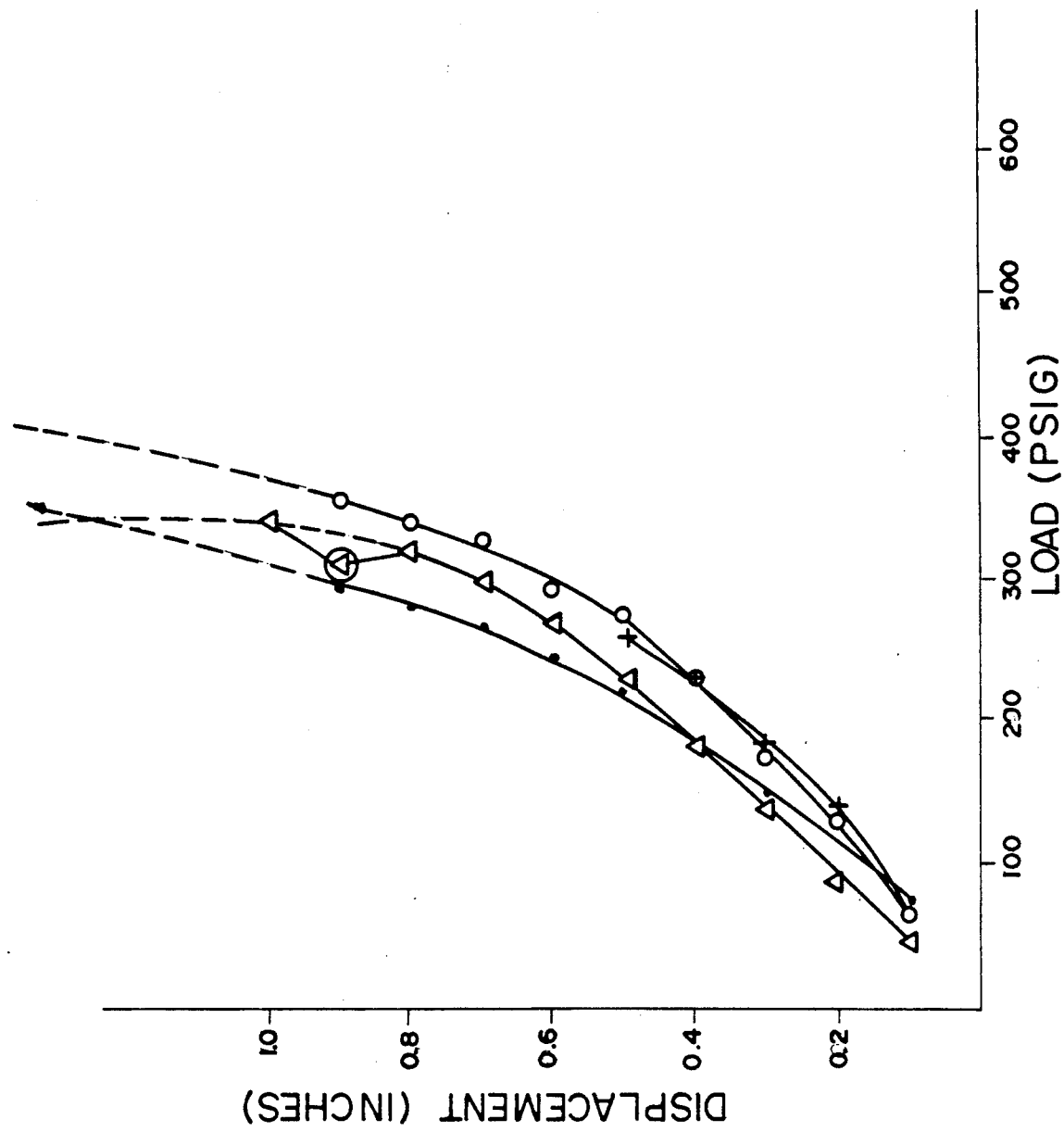

For testing and comparing conventional forks with the fork of the invention, three different types of static tests were conducted using the testing set-ups illustrated in FIGS. 39-41. FIG. 39 shows a forward/aft load testing set-up. This test entails supporting the fork horizontally by the steerer tube 231 in a fixture 230 and applying a load to the fork tips 232 and pulling them back in a direction perpendicular to the axis of the steerer tube and in the plane of a bicycle frame. Load and displacement are then recorded and plotted The fork may be tested to obtain an initial stress/strain curve or to failure. FIG. 42 is a graph showing such data. Line 210 resulted from testing a prototype with crown and blades made in accordance with the invention, but with a standard cylindrical steerer tube without a laterally and downwardly extending foot such as strap 60. This unit failed at about 350 PSIG when the cylindrical steerer tube separated from the composite crown. Line 212 resulted from testing a conventional steel/aluminum fork made by Tange. Line 214 resulted from testing a composite fork made in accordance with the preferred embodiment of the invention wherein the steerer assembly includes a flared foot. Line 216 resulted from testing a second composite fork made in accordance with the invention, this testing stopping short of failure to avoid damage to the fork. The zig zag at 213 in line 212 indicates the yield point in an aluminum portion of the fork. With respect to line 214, the composite fork of the invention ultimately yielded at 510 PSIG after a displacement of 3.2 inches. Not only is the composite fork of the invention stronger than conventional steel/aluminum forks as illustrated in FIG. 42, but it is also lighter by as much as 17%. The broken line extensions of lines 210, 212 and 214 represent extrapolations from existing data because it was not practicable to obtain actual measurements at data positions close to the point of yield or failure.

In addition to load testing to failure, the test set-up of FIG. 39 was used to determine forward/aft deflections using a standard weight 235, such as a 30 lbs. weight. In this test, the fork is mounted horizontally in the fixture 230 with the fork tips 232—232 connected together with an axle type member 234. The 30 lb. weight is applied perpendicular to axle 234 by mounting the fork with its blades in a horizontal plane as shown in FIG. 39. For measuring lateral deflections, the weight 235 is applied along the axis of axle 234 by mounting the fork with its blades in a vertical plane as shown in FIG. 40. In each case, the deflection of the blades in response to application of the weight is measured and recorded.

In the aft displacement test of FIG. 39, weight 235 is mounted between the fork ends 232. In a third test to determine torsional deflection, the fork is mounted horizontally as in FIG. 39, but the weight 235 is attached to an extension 233 of axle 232 so that it is outboard of the tips to one side of the fork assembly as illustrated in FIG. 41.

The results of these tests are shown in Table I. In this table, the fork designated as "KESTREL, FIBER" was made in accordance with the present invention, and--. "N/A" means that the forks concerned were no longer available when the torsion testing was done.

TABLE I

| FORK | DEFLECTION MEASUREMENTS IN INCHES (30 LB. LOAD) | | | |
|---|---|---|---|---|
|  | WEIGHT,LBS | FORWARD | LATERAL | TORSION |
| LOOK, FIBER | 1.11 | 0.134 | 0.146 | N/A |
| BADOR, ALUM | 1.21 | 0.077 | 0.105 | N/A |
| TANGE, ALUM | 1.26 | 0.096 | 0.118 | 0.082 |
| TREK, ALUM | 1.29 | 0.099 | 0.109 | 0.085 |
| TANGE, STEEL | 1.49 | 0.061 | 0.076 | N/A |
| KESTREL, FIBER | 1.00 | 0.077 | 0.121 | 0.062 |

The foregoing tests help to ascertain the handling and ride characteristics of the front fork of a bicycle. A higher value in the forward/aft test equates to a softer ride and a lower value results in a rougher ride. In the lateral test, a lower value is desirable since it results in a better handling bike. On the other hand, if the lateral value is too high, the bike will tend to handle poorly in cornering. The torsional value indicates the response of a fork to rider input. While it may not appear initially from the test data in Table I that the fork of the invention is significantly better than its aluminum and steel counterparts, it should be kept in mind that there measurements are but an attempt to quantify by practicable tests what is a very sensitive part (the front fork) in the handling of a bicycle. Accordingly, relatively small changes in the values presented in Table I can make large differences in the handling characteristics of the bicycle. Furthermore, much of the improved performance realized with the fork of the invention cannot be quantified by such tests. Such improvements in performance include improved vibration damping characteristics and favorable resonance characteristics that enable the contact patch of the tire to maintain better adhesion to a road surface through a wider range of operating conditions.

Fatigue testing in a set-up similar to FIG. 39 was also carried out to compare the fork of the invention with the conventional Tange steel/aluminum fork. In these tests, sufficient load was applied to the fork tips to cause cyclic displacements of plus and minus 0.32 inches. This load was then cycled at approximately 250 cycles per minute during the period of the test. While the aluminum/steel failed after about 64,000 cycles, the fork of the invention had not failed after 102,000 cycles, at which point the fatigue testing was terminated. The conventional aluminum/Tange fork failed when a crack developed in the steerer tube.

What is claimed is:

1. A fork assembly for a cycle comprising:

a steerer assembly having a tubular portion and an anchor means, said anchor means including an anchor member extending radially beyond said tubular portion; and, a generally hollow crown and blade component extending longitudinally between and connecting said steerer assembly and a wheel support means for supporting a wheel assembly, said crown and blade component comprising a substantially continuous wall of a fibrous material impregnated with a synthetic resin extending around at least a portion of an interior chamber of said crown and blade component, said substantially continuous wall having at least two opposing wall sections each of which comprises at least one cured layer of said resin-impregnated fibrous material, and at least part of said anchor member being laminated between and adhesively secured to said opposing wall sections to fixedly connect said crown and blade component to said steerer assembly.

2. A fork assembly according to claim 1 wherein one of said opposing wall sections is integrally united by a pressure molded juncture to the other of said opposing wall sections through at least one aperture in said anchor member.

3. A fork assembly according to claim 1 wherein one of said opposing wall sections is provided by a generally hollow crown portion of said crown and blade component and the other of said opposing wall sections is provided by a generally hollow blade portion of said crown and blade component.

4. A fork assembly according to claim 3 wherein said anchor member has at least one aperture through which said crown wall section is integrally united to said blade wall section by a molded juncture.

5. A fork assembly according to claim 1 wherein said tubular portion has a lower part extending axially through a central portion of said chamber and said radially extending anchor member comprises a foot portion provided at a lower end of said lower tubular part and extending radially beyond said lower end in adhesive abutment with a lower wall of said chamber.

6. A fork assembly according to claim 1 wherein said radially extending anchor member comprises a flared skirt on a lower part of said tubular portion and said flared skirt extends radially beyond said lower part in adhesive abutment with an upper wall of said chamber.

7. A fork assembly according to claim 6 wherein an outer surface of said flared skirt is in adhesive abutment with said upper wall of the chamber, and wherein at least part of an inner surface of said flared skirt opposite to said outer surface is covered with a reinforcing layer comprising at least one ply of fibrous material impregnated with a synthetic resin.

8. A fork assembly according to claim 7 wherein said flared skirt has at least one aperture through which said upper wall is moldedly bonded to said reinforcing layer.

9. A fork assembly according to claim 1 wherein said anchor member comprises two depending legs flared outward radially beyond said tubular portion of said steerer assembly, and wherein said crown and blade component comprises two generally hollow blade portions each integrally unit to a generally hollow crown portion by a pressure molded juncture, each of said blade and crown portions comprising at least one molded layer of fibrous material impregnated with a synthetic resin.

10. A fork assembly according to claim 9 wherein each of the legs of said anchor member contains an aperture, wherein a wall section of one of said blade portions is moldedly bonded through the aperture of one of said legs to a wall section of said crown portion, and wherein a wall section of the other of said blade portions is moldedly bonded through the aperture of the other of said legs to another wall section of said crown portion.

11. A fork assembly according to claim 1 wherein said crown and blade component comprises two substantially hollow blade portions and a substantially hollow crown portion, wherein each of said blade portions comprises at least one corresponding strip of resin impregnated fibrous material, wherein said crown portion comprises at least one patch of resin impregnated fibrous material, wherein said anchor member is connected to an end of said tubular portion and has a pair of downwardly diverging legs each extending radially beyond said tubular portion, and wherein each of said blade strips is moldedly bonded to said crown patch.

12. A fork assembly according to claim 11 wherein each of said diverging legs has an aperture therein, and wherein the strip of one of said blade portions is moldedly bonded to said crown patch through the aperture of a corresponding one of said legs and the strip of the other of said blade portions is moldedly bonded to said crown patch through the aperture of the other of said legs.

13. A fork assembly according to claim 11 wherein said crown portion comprises a second patch of resin impregnated fibrous material, said second patch being moldedly bonded to said strips of both of said blade portions and adhesively bonded both to said anchor member and to a second radially extending member carried by the tubular portion of said steerer assembly at an intermediate axial position spaced along said tubular portion at an axial distance from said anchor member.

14. The fork assembly according to claim 1 wherein said crown and blade component comprises two generally hollow blade portions interconnected by a substantially hollow crown portion having two depending legs, one corresponding to each of said blade portions, wherein a central part of said crown portion is molded around and adhesively bonded to at least part of said anchor member, and wherein an upper part of each of said blade portions is overlapped with a downwardly extending lower part of a corresponding one of said crown legs to provide a transition overlap for a distance defining a transition length, said transition overlap comprising a pressure molded juncture.

15. A fork assembly according to claim 14 wherein the longitudinal axis of one of said blades makes an angle greater than 4 degrees to one side of the longitudinal axis of said tubular portion, and the longitudinal axis of the other of said blades makes an angle greater than 4 degrees to the other side of the longitudinal axis of said tubular portion.

16. A fork assembly according to claim 14 wherein said transition length is at least three inches.

17. A fork assembly according to claim 14 wherein said tubular portion carries an annular bearing seat for rotatably engaging a head tube of a bicycle frame, wherein a bearing surface of said bearing seat is an axial distance of at least 4 inches from a lower end of each of said crown legs, and wherein an upper wall of said crown portion comprises at least one cured layer of resin-impregnated fibrous material adhesively bonded to said bearing seat.

18. A fork assembly according to claim 1 wherein said crown and blade component comprises a generally hollow crown portion molded around and adhesively bonded to at least a part of said anchor member, a generally hollow right blade portion extending between said crown portion and a wheel support means for engaging the right side of a wheel assembly, and a generally hollow left blade portion extending between said crown portion and a wheel support means for engaging the left side of a wheel assembly, each of said blade portions being integrally united to said crown portion by a pressure molded juncture to form said crown and blade component.

19. A fork assembly according to claim 4 wherein said molded juncture is a pressure molded juncture.

20. A fork assembly according to claim 1 wherein said crown and blade component further comprises at least two adjacent wall sections each comprising at least one molded layer of fibrous material impregnated with a synthetic resin, said adjacent wall sections being integrally united by at least one pressure molded juncture to provide a unitary wall of said resin impregnated fibrous material around an interior cavity of said crown and blade component, said at least one pressure molded juncture comprising overlapping layers of said resin impregnated fibrous material provided by overlapped parts of said adjacent wall sections.

21. A fork assembly according to claim 20 wherein said overlapping parts are meldedly bonded together.

22. A fork assembly according to claim 1 wherein said anchor member has an elongated outer surface extending longitudinally beyond said tubular portion of said steerer assembly, and one of said opposing wall sections is in molded abutment with and adhesively secured to said outer surface.

23. A fork assembly according to claim 1 wherein said opposing wall sections are moldedly bonded together to enclose and engage at least a portion of said anchor member to mechanically lock said crown and blade component to said steerer assembly.

24. A fork assembly according to claim 1 wherein said steerer assembly is made of metal.

25. A fork assembly for a cycle comprising:
a steerer assembly having a tubular portion and an anchor means, said anchor means comprising two opposing leg portions extending in opposite directions radially outward beyond said tubular portion; and,
a generally hollow crown and blade component extending longitudinally between and connecting said steerer assembly and a wheel support means for supporting a wheel assembly, said crown and blade component comprising a substantially continuous wall of fibrous material impregnated with a synthetic resin extending around at least a portion of an interior cavity of said crown and blade component, a first section of said substantially continuous wall being in molded abutment with and adhesively secured to one of said opposing leg portions and a second section of said substantially continuous wall being in molded abutment with and adhesively secured to the other of said opposing leg portions to fixedly connect said crown and blade component to said steerer assembly.

26. A fork assembly according to claim 25 wherein said crown and blade component further comprises at least two adjacent wall sections each comprising at least one molded layer of fibrous material impregnated with a synthetic resin, said adjacent wall sections being integrally united by at least one pressure molded juncture to provide a unitary wall of said resin impregnated fibrous material around at least a portion of said interior cavity of said crown and blade component, said at least one pressure molded juncture comprising overlapping layers of said resin impregnated fibrous material provided by overlapped parts of said adjacent wall sections.

27. A fork assembly according to claim 25 wherein said tubular portion of the steerer assembly has a lower tubular part extending axially through a central portion of said interior cavity an said opposing leg portions of the anchor means are provided at a lower end of said lower tubular part and extend radially beyond said lower end in pressure molded abutment with a lower wall of said interior cavity.

28. A fork assembly according to claim 25 wherein said opposing leg portions of the anchor means form an outwardly flared skirt on a lower tubular part of said tubular portion of the steerer assembly and said flared skirt extends radially beyond said lower tubular part in pressure molded abutment with an upper wall of said interior cavity.

29. A fork assembly according to claim 25 wherein said steerer assembly is made of metal.

30. A fork assembly for a cycle comprising:
a steerer assembly having a tubular portion and an anchor means, said anchor means including an anchor member extending radially beyond said tubular portion; and,
a generally hollow crown and blade component extending longitudinally between and connecting said steerer assembly and a wheel support means for supporting a wheel assembly, said crown and blade component comprising a substantially continuous wall of a fibrous material impregnated with a synthetic resin extending around at least a portion of an interior cavity of said crown and blade component, said substantially continuous wall having at least two opposing wall sections each of which comprises at least one cured layer of said resin-impregnated fibrous material, said opposing wall sections being bonded together to enclose and engage at least a portion of said anchor member to mechanically lock said crown and blade component to said steerer assembly.

31. A fork assembly according to claim 30 wherein said anchor member has two leg portions each extending outward radially beyond said tubular portion of the steerer assembly, and wherein said opposing wall sections are moldedly bonded together to enclose and engage at least part of each of said leg portions.

32. A fork assembly according to claim 31 wherein each of said leg portions of the anchor member contains an aperture, wherein a first wall section of said substantially continuous wall is moldedly bonded through the aperture of one of said leg portions to a second wall section of said substantially continuous wall; and wherein a third wall section of said substantially continuous wall is moldedly bonded through the aperture of the other of said leg portions to a fourth wall section of said substantially continuous wall.

33. A fork assembly according to claim 30 wherein said opposing wall sections are bonded together by a pressure molded juncture.

34. A fork assembly according to claim 30 wherein said crown and blade component further comprises at least two adjacent wall sections each comprising at least one molded layer of fibrous material impregnated with a synthetic resin, said adjacent wall sections being integrally united by at least one pressure molded juncture to provide a unitary wall of said resin impregnated fibrous material around at least a portion of said interior cavity of said crown and blade component, said at least one pressure molded juncture comprising overlapping layers of said resin impregnated fibrous material provided by overlapped parts of said adjacent wall sections.

35. A fork assembly according to claim 30 wherein said steerer assembly is made of metal.

* * * * *

UNITED STATES PATENT AND TRADEMARK OFFICE
CERTIFICATE OF CORRECTION

PATENT NO. : 5,016,895

DATED : May 21, 1991

INVENTOR(S) : Hollingsworth, et al.

It is certified that error appears in the above-identified patent and that said Letters Patent is hereby corrected as shown below:

Column 27, line 64, change "unit" to --united--.

Column 30, line 14, change "an" to --and--.

Signed and Sealed this

Twenty-second Day of September, 1992

Attest:

DOUGLAS B. COMER

*Attesting Officer*      *Acting Commissioner of Patents and Trademarks*